US012710814B2

(12) United States Patent
Kang et al.

(10) Patent No.: US 12,710,814 B2
(45) Date of Patent: Aug. 18, 2026

(54) WEARABLE DEVICE, METHOD, AND COMPUTER-READABLE STORAGE MEDIUM, FOR ADJUSTING GAZE INFORMATION OF USER

(71) Applicant: Samsung Electronics Co., Ltd., Suwon-si (KR)

(72) Inventors: Jinmo Kang, Suwon-si (KR); Beomsu Kim, Suwon-si (KR); Sungoh Kim, Suwon-si (KR); Gunhee Lee, Suwon-si (KR); Sanghun Lee, Suwon-si (KR); Sunyoung Jung, Suwon-si (KR); Jihyun Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/082,779

(22) Filed: Mar. 18, 2025

(65) Prior Publication Data

US 2025/0216939 A1 Jul. 3, 2025

Related U.S. Application Data

(63) Continuation of application No. PCT/KR2023/013290, filed on Sep. 5, 2023.

(30) Foreign Application Priority Data

Oct. 6, 2022 (KR) ........................ 10-2022-0128197
Nov. 15, 2022 (KR) ........................ 10-2022-0152771

(51) Int. Cl.
*G06F 3/01* (2006.01)
*G02B 27/01* (2006.01)
(Continued)

(52) U.S. Cl.
CPC ......... *G06F 3/013* (2013.01); *G02B 27/0172* (2013.01); *G06F 3/017* (2013.01); *G06V 20/20* (2022.01); *G06V 40/18* (2022.01)

(58) Field of Classification Search
CPC ...................................................... G06F 3/013
See application file for complete search history.

(56) References Cited

U.S. PATENT DOCUMENTS 9,529,442 B2 12/2016 Cho et al.
9,823,764 B2 11/2017 Schwesinger et al.
(Continued)

FOREIGN PATENT DOCUMENTS

JP 2017-078891 A 4/2017
JP 6677239 B2 4/2020
(Continued)

OTHER PUBLICATIONS

International Search Report dated Dec. 26, 2023, issued in International Application No. PCT/KR2023/013290.
(Continued)

*Primary Examiner* — Chun-Nan Lin
(74) *Attorney, Agent, or Firm* — Jefferson IP Law, LLP

(57) ABSTRACT

In accordance with an aspect of the disclosure, a wearable device is provided. The wearable device includes a first camera, a second camera, a display, memory storing one or more computer programs; and one or more processors communicatively coupled to the first camera, the second camera, the display, and the memory, wherein the one or more computer programs include computer-executable instructions that, when executed by the at one or more processors individually or collectively, cause the wearable device to display, using the display, a visual object within a field of view (FoV) of a user in a state where the wearable device is worn by the user, while displaying the visual
(Continued)

object, based on the first camera disposed toward the FoV, identify an external object, interacting with the visual object, seen through the FoV, obtain a position of the external object, based on identifying an interaction between the external object and the visual object using the first camera, and change information indicating a direction of eyes, identified by frames outputted from the second camera disposed toward the eyes of the user, using at least one of a position of the visual object or the position of the external object, based on obtaining the position of the external object.

20 Claims, 15 Drawing Sheets

(51) Int. Cl.
*G06V 20/20* (2022.01)
*G06V 40/18* (2022.01)

(56) References Cited

U.S. PATENT DOCUMENTS

| | | | |
|---|---|---|---|
| 10,248,199 B2 | 4/2019 | Wilairat et al. | |
| 10,277,787 B2 | 4/2019 | Andersson et al. | |
| 10,496,158 B2 | 12/2019 | Terahata | |
| 10,630,965 B2 | 4/2020 | Held et al. | |
| 10,635,170 B2 | 4/2020 | Yosha et al. | |
| 11,023,038 B2 | 6/2021 | Yasuda et al. | |
| 11,245,836 B2 | 2/2022 | Lei et al. | |
| 11,574,447 B2 | 2/2023 | Lin et al. | |
| 2013/0154913 A1 | 6/2013 | Genc et al. | |
| 2014/0191927 A1 | 7/2014 | Cho | |
| 2015/0331485 A1 | 11/2015 | Wilairat et al. | |
| 2017/0099481 A1* | 4/2017 | Held | H04N 13/383 |
| 2017/0344111 A1 | 11/2017 | Kim | |
| 2018/0120934 A1 | 5/2018 | Taguchi | |
| 2022/0019450 A1 | 1/2022 | Vanblon et al. | |
| 2022/0058876 A1* | 2/2022 | Lin | G06V 20/20 |
| 2022/0155859 A1* | 5/2022 | Yan | G06V 40/193 |

FOREIGN PATENT DOCUMENTS

| | | |
|---|---|---|
| KR | 10-2014-0090552 A | 7/2014 |
| KR | 10-1499044 B1 | 3/2015 |
| KR | 10-2191870 B1 | 12/2020 |

OTHER PUBLICATIONS

European Search Report dated Nov. 3, 2025, issued in European Application No. 23875078.0.

* cited by examiner

WEARABLE DEVICE, METHOD, AND COMPUTER-READABLE STORAGE MEDIUM, FOR ADJUSTING GAZE INFORMATION OF USER

CROSS-REFERENCE TO RELATED APPLICATION(S)

This application is a continuation application, claiming priority under 35 U.S.C. § 365 (c), of an International application No. PCT/KR2023/013290, filed on Sep. 5, 2023, which is based on and claims the benefit of a Korean patent application number 10-2022-0128197, filed on Oct. 6, 2022, in the Korean Intellectual Property Office, and of a Korean patent application number 10-2022-0152771, filed on Nov. 15, 2022, in the Korean Intellectual Property Office, the disclosure of each of which is incorporated by reference herein in its entirety.

BACKGROUND

1. Field

The disclosure relates to a wearable device, a method, and a computer-readable storage medium for adjusting gaze information of a user.

2. Description of Related Art

Various services are provided through a wearable device. The wearable device may be operated by being worn on a part of a body of a user. The wearable device may display a visual object within a field-of-view (FoV), using a display. The wearable device may identify information indicating a direction of eyes of the user using a camera for identifying the eyes of the user. For example, the wearable device may identify an external object that interacts with the visual object, using another camera for identifying an external environment. The wearable device may identify an interaction between the visual object and/or the external object.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to a wearable device, a method, and a computer-readable storage medium for adjusting gaze information of a user.

Additional aspects will be set forth in part in the description which follows and, in part, will be apparent from the description, or may be learned by practice of the presented embodiments.

In accordance with an aspect of the disclosure, a wearable device is provided. The wearable device includes a first camera, a second camera, a display, memory storing one or more computer programs and one or more processors communicatively coupled to the first camera, the second camera, the display, and the memory, wherein the one or more computer programs include computer-executable instructions that, when executed by the at one or more processors individually or collectively, cause the wearable device to display, using the display, a visual object within a field of view (FoV) of a user, in a state where the wearable device is worn by the user, while displaying the visual object, based on the first camera disposed toward the FoV, identify an external object, interacting with the visual object, seen through the FoV, obtain a position of the external object, based on identifying an interaction between the external object and the visual object using the first camera, and change information indicating a direction of eyes identified by frames outputted from the second camera disposed toward the eyes of the user, using at least one of a position of the visual object or the position of the external object, based on obtaining the position of the external object.

In accordance with another aspect of the disclosure, a method performed by a wearable device is provided. The method includes displaying, by the wearable device using a display, a visual object within a field of view (FoV) of a user, in a state where the wearable device is worn by the user, while displaying the visual object, based on a first camera disposed toward the FoV, identifying, by the wearable device, an external object, interacting with the visual object, seen through the FoV, obtaining, by the wearable device, a position of the external object, based on identifying an interaction between the external object and the visual object using the first camera, and changing, by the wearable device, information indicating a direction of eyes identified by frames outputted from a second camera disposed toward the eyes of the user, using at least one of a position of the visual object or the position of the external object, based on obtaining the position of the external object.

In accordance with another aspect of the disclosure, one or more non-transitory computer-readable storage media storing one or more computer programs including computer-executable instructions that, when executed by one or more processors of a wearable device individually or collectively, cause the wearable device to perform operations are provided. The operations include displaying, by the wearable device using a display, a visual object within a field of view (FoV) of a user, in a state where the wearable device is worn by the user, while displaying the visual object, based on a first camera disposed toward the FoV, identifying, by the wearable device, an external object, interacting with the visual object, seen through the FoV, obtaining, by the wearable device, a position of the external object, based on identifying an interaction between the external object and the visual object using the first camera, and changing, by the wearable device information indicating a direction of eyes identified by frames outputted from a second camera disposed toward the eyes of the user, using at least one of a position of the visual object or the position of the external object, based on obtaining the position of the external object.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
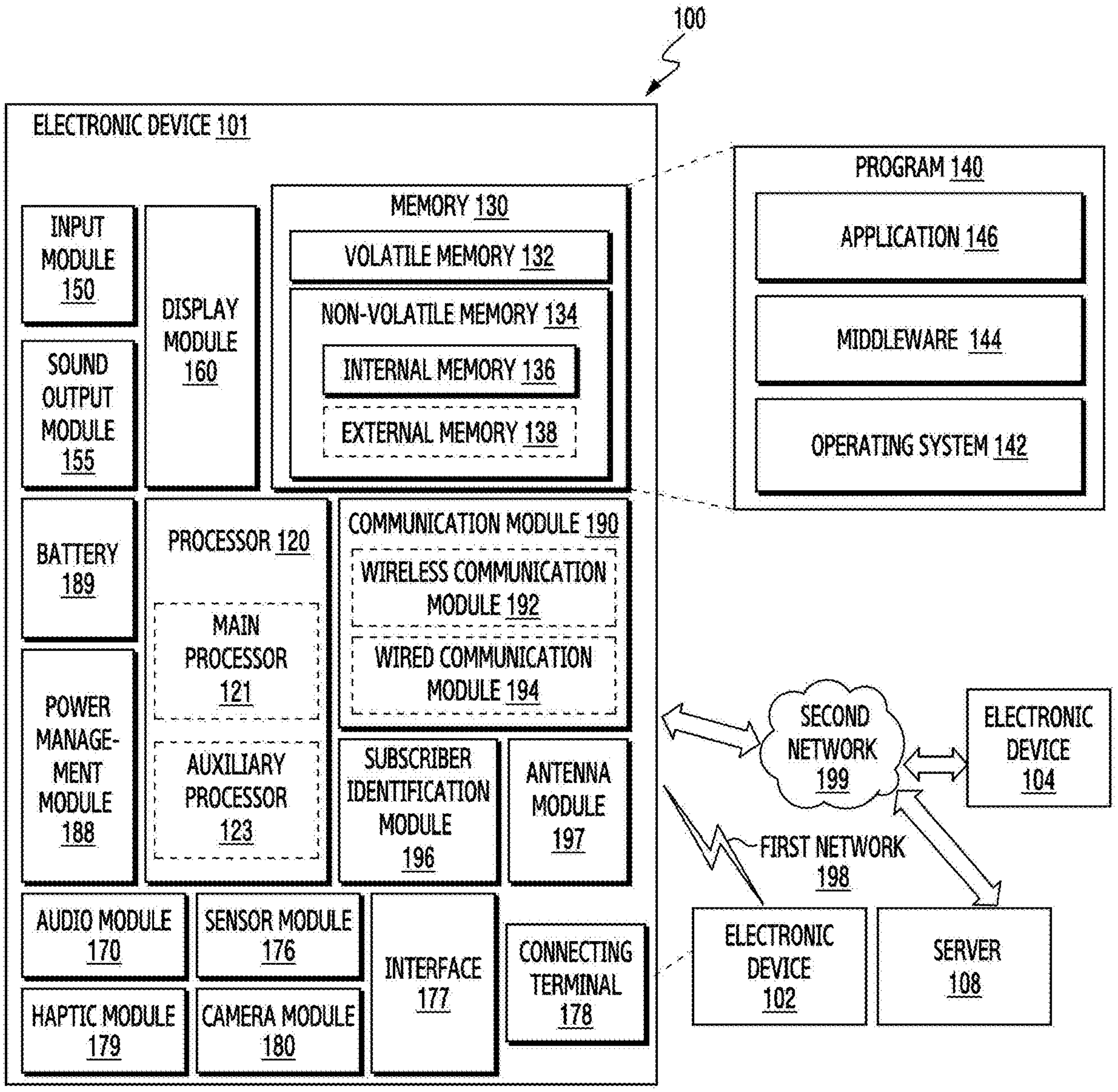
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the disclosure and terms used herein are not intended to limit the technology described in the disclosure to specific embodiments, and should be understood to include various modifications, equivalents, or substitutes of the corresponding embodiment. In relation to the description of the drawings, a reference numeral may be used for a similar component. In the disclosure, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the disclosure may include a unit configured with hardware, software, or firmware, and may be used interchangeably with terms such as logic, logic block, component, or circuit, and the like. The module may be an integrally configured component or a minimum unit or part thereof that performs one or more functions. For example, a module may be configured with an application-specific integrated circuit (ASIC).

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to yet another embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to yet another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to yet another embodiment, the auxiliary processor 123 (e.g., an image signal processor or a communication processor) may be implemented as part of another component (e.g., the camera module 180 or the communication module 190) functionally related to the auxiliary processor 123. According to yet another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to yet another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to yet another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to yet another embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to yet another embodiment, the haptic module 179 may include, for example, a motor, a piezoelectric element, or an electric stimulator.

The camera module 180 may capture a still image or moving images. According to yet another embodiment, the camera module 180 may include one or more lenses, image sensors, image signal processors, or flashes.

The power management module 188 may manage power supplied to the electronic device 101. According to yet another embodiment, the power management module 188 may be implemented as at least part of, for example, a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element composed of a conductive material or a conductive pattern formed in or on a substrate (e.g., a printed circuit board (PCB)). According to yet another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a mmWave antenna module. According yet another an embodiment, the mm Wave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to yet another embodiment, all or some of operations to be executed at the electronic device 101 may be executed at one or more of the external electronic devices 102, or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to yet another embodiment of the disclosure, the electronic devices are not limited to those described above.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
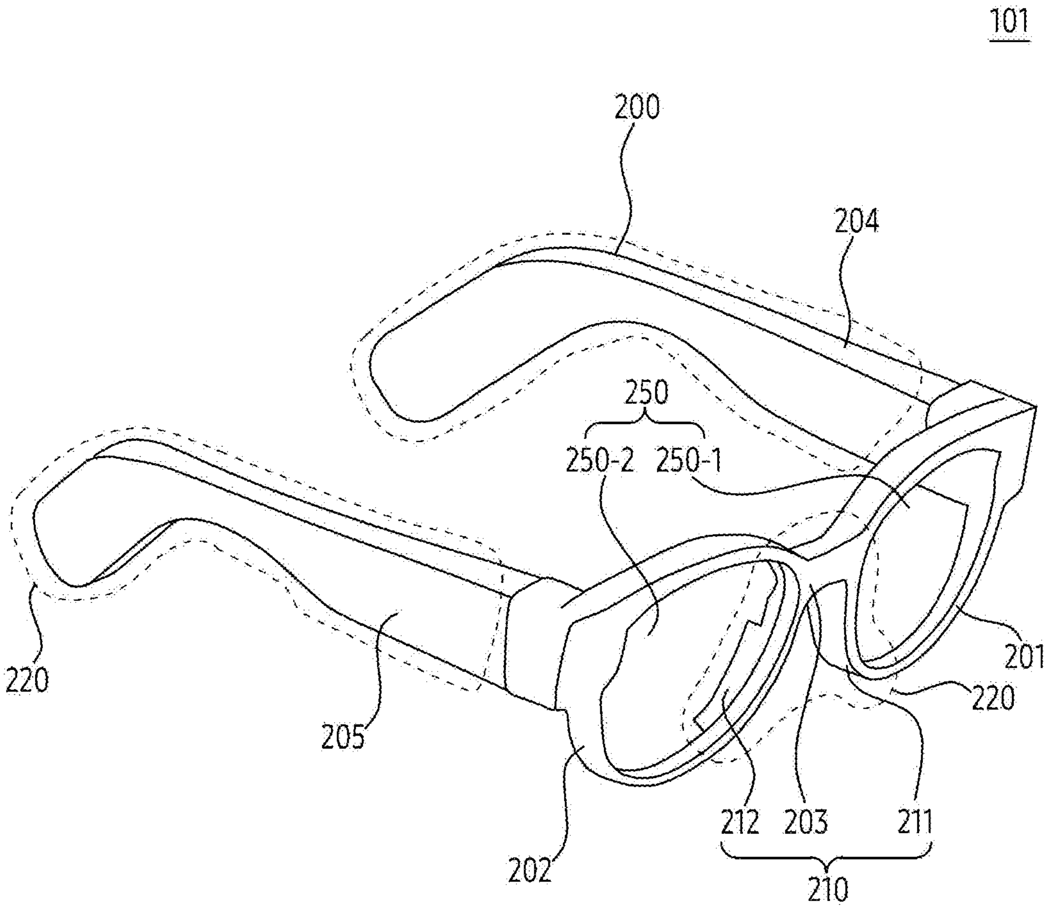
FIG. 2A illustrates an example of a prospective view of a wearable device according to an embodiment of the disclosure.

FIG. 2A illustrates an example of a perspective view of a wearable device according to an embodiment of the disclosure.

Figure 2B:
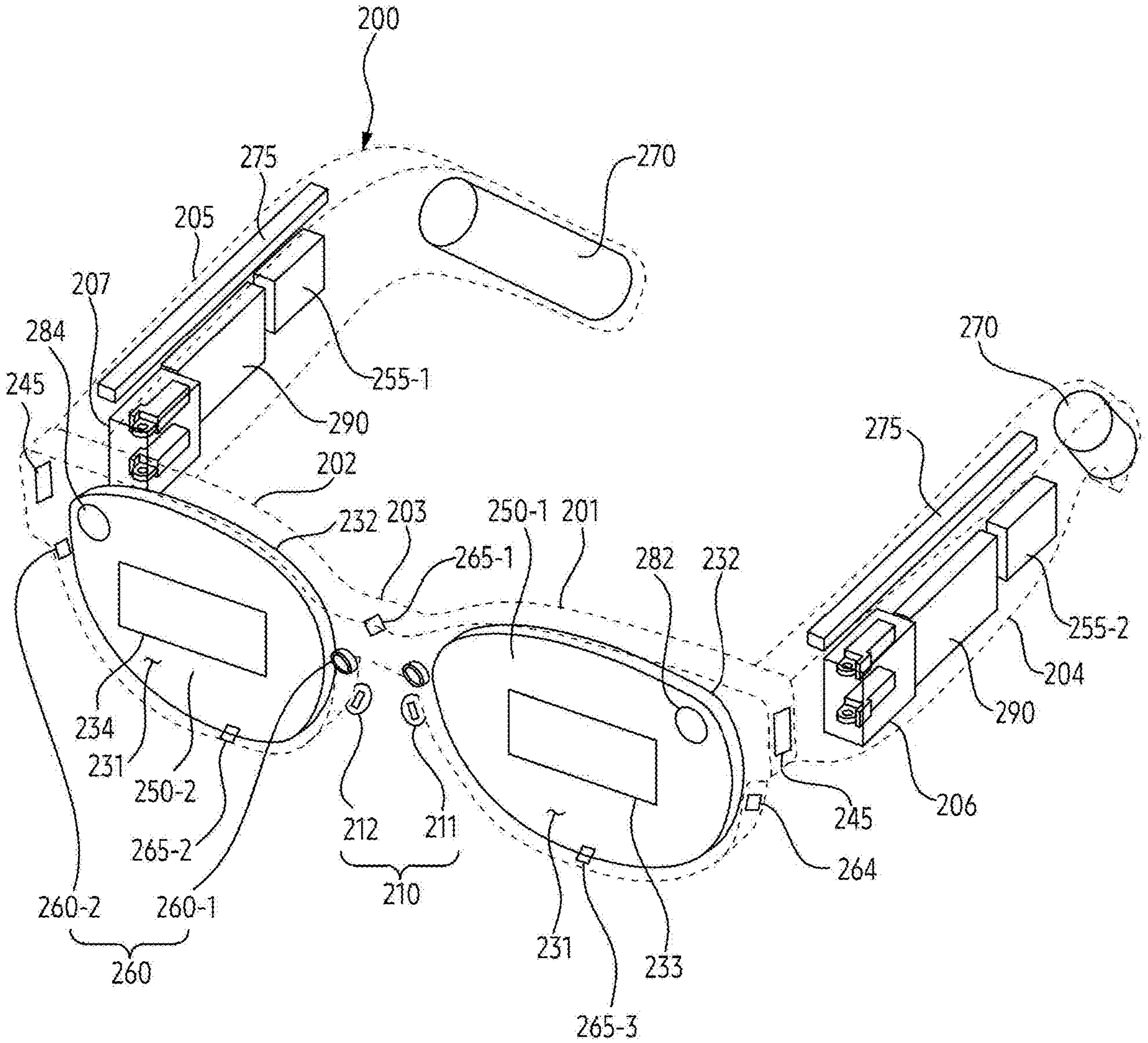
FIG. 2B illustrates an example of one or more hardware disposed in a wearable device according to an embodiment of the disclosure.

FIG. 2B illustrates an example of one or more hardware disposed in a wearable device according to an embodiment of the disclosure.

According to an embodiment, the wearable device 101 may have a shape of glasses wearable on a user's body part (e.g., head). The wearable device 101 of FIGS. 2A and 2B may be an example of the electronic device 101 of FIG. 1. The wearable device 101 may include a head-mounted display (HMD). For example, a housing of the wearable device 101 may include flexible materials, such as rubber and/or silicone, that have a shape closely fitting a part (e.g., a part of the face surrounding both eyes) of the user's head. For example, the housing of the wearable device 101 may include one or more straps able to be twined around the user's head and/or one or more temples attachable to ear of the head.

Referring to FIG. 2A, according to an embodiment, the wearable device 101 may include at least one display 250 and a frame 200 supporting the at least one display 250.

According to an embodiment, the wearable device 101 may be wearable on a portion of the user's body. The wearable device 101 may provide augmented reality (AR), virtual reality (VR), or mixed reality (MR) combining the augmented reality and the virtual reality to a user wearing the wearable device 101. For example, the wearable device 101 may display a virtual reality image provided from at least one optical device 282 and 284 of FIG. 2B on at least one display 250, in response to a user's preset gesture obtained through a motion recognition camera 260-2 and 264 of FIG. 2B.

According to another embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may provide visual information transmitted through a lens included in at least one display 250 from ambient light to a user and other visual information distinguished from the visual information. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of at least one display 250. When the user wears the wearable device 101, ambient light may be transmitted to the user by being incident on the first surface 231 and being penetrated through the second surface 232. For another example, the at least one display 250 may display an augmented reality image in which a virtual reality image provided by the at least one optical device 282 and 284 is combined with a reality screen transmitted through ambient light, on a display area formed on the second surface 232.

In yet another embodiment, the at least one display 250 may include at least one waveguide 233 and 234 that transmits light transmitted from the at least one optical device 282 and 284 by diffracting to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal or curved shape. Light incident to an end of the at least one waveguide 233 and 234 may be propagated to another end of the at least one waveguide 233 and 234 by the nano pattern. The at least one waveguide 233 and 234 may include at least one of at least one diffraction element (e.g., a diffractive optical element (DOE), a holographic optical element (HOE)), and a reflection element (e.g., a reflection mirror). For example, the at least one waveguide 233 and 234 may be disposed in the wearable device 101 to guide a screen displayed by the at least one display 250 to the user's eyes. For example, the screen may be transmitted to the user's eyes through total internal reflection (TIR) generated in the at least one waveguide 233 and 234.

The wearable device 101 may analyze an object included in a real image collected through a photographing camera 245, combine with a virtual object corresponding to an object that become a subject of augmented reality provision among the analyzed object, and display on the at least one display 250. The virtual object may include at least one of text and images for various information associated with the object included in the real image. The wearable device 101 may analyze the object based on a multi-camera such as a stereo camera. For the object analysis, the wearable device 101 may execute simultaneous localization and mapping (SLAM) and/or time-of-flight (ToF), supported by the multi-camera. The user wearing the wearable device 101 may watch an image displayed on the at least one display 250.

According to yet another embodiment, a frame 200 may be configured with a physical structure in which the wearable device 101 may be worn on the user's body. According to an embodiment, the frame 200 may be configured so that when the user wears the wearable device 101, the first display 250-1 and the second display 250-2 may be positioned corresponding to the user's left and right eyes. The frame 200 may support the at least one display 250. For example, the frame 200 may support the first display 250-1 and the second display 250-2 to be positioned at positions corresponding to the user's left and right eyes.

Referring to FIG. 2A, according to an embodiment, the frame 200 may include an area 220 at least partially in contact with the portion of the user's body in case that the user wears the wearable device 101. For example, the area 220 of the frame 200 in contact with the portion of the user's body may include an area in contact with a portion of the user's nose, a portion of the user's ear, and a portion of the side of the user's face that the wearable device 101 contacts. According to another embodiment, the frame 200 may include a nose pad 210 that is contacted on the portion of the user's body. When the wearable device 101 is worn by the user, the nose pad 210 may be contacted on the portion of the user's nose. The frame 200 may include a first temple 204 and a second temple 205, which are contacted on another portion of the user's body that is distinct from the portion of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to yet another embodiment, the wearable device 101 may identify an external object (e.g., a user's fingertip) touching the frame 200 and/or a gesture performed by the external object by using a touch sensor, a grip sensor, and/or a proximity sensor formed on at least a portion of the surface of the frame 200.

According to yet another embodiment, the wearable device 101 may include hardware (e.g., hardware to be described later based on a block diagram of FIG. 4) that performs various functions. For example, the hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., printed circuit board). Various hardware may be disposed in the frame 200.

According to yet another embodiment, the microphone (e.g., the microphones 265-1, 265-2, and 265-3) of the wearable device 101 may obtain a sound signal, by being disposed on at least a portion of the frame 200. The first microphone 265-1 disposed on the nose pad 210, the second microphone 265-2 disposed on the second rim 202, and the third microphone 265-3 disposed on the first rim 201 are illustrated in FIG. 2B, but the number and disposition of the microphone 265 are not limited to an embodiment of FIG. 2B. In case that the number of the microphone 265 included in the wearable device 101 is two or more, the wearable device 101 may identify a direction of the sound signal by using a plurality of microphones disposed on different portions of the frame 200.

According to yet another embodiment, the at least one optical device 282 and 284 may project a virtual object on the at least one display 250 in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. According to yet another embodiment, the wearable device 101 may include a first optical device 282 corresponding to the first display 250-1, and a second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first waveguide 233 disposed on the first display 250-1, and the second optical device 284 may transmit light to the second waveguide 234 disposed on the second display 250-2.

In yet another embodiment, a camera 260 may include the photographing camera 245, an eye tracking camera (ET CAM) 260-1, and/or the motion recognition camera 260-2. The photographing camera 245, the eye tracking camera 260-1, and the motion recognition camera 260-2 and 264 may be disposed at different positions on the frame 200 and may perform different functions. The eye tracking camera 260-1 may output data indicating a gaze of the user wearing the wearable device 101. For example, the wearable device 101 may detect the gaze from an image including the user's pupil obtained through the eye tracking camera 260-1. An example in which the eye tracking camera 260-1 is disposed toward the user's right eye is illustrated in FIG. 2B, but the embodiment is not limited thereto, and the eye tracking camera 260-1 may be disposed alone toward the user's left eye or may be disposed toward two eyes.

In yet another embodiment, the photographing camera 245 may photograph a real image or background to be matched with a virtual image in order to implement the augmented reality or mixed reality content. The photographing camera 245 may photograph an image of a specific object existing at a position viewed by the user and may provide the image to the at least one display 250. The at least one display 250 may display one image in which a virtual image provided through the at least one optical device 282 and 284 is overlapped with information on the real image or background including an image of the specific object obtained by using the photographing camera 245. In yet another embodiment, the photographing camera 245 may be disposed on the bridge 203 disposed between the first rim 201 and the second rim 202.

The eye tracking camera 260-1 may implement a more realistic augmented reality by matching the user's gaze with the visual information provided on the at least one display 250, by tracking the gaze of the user wearing the wearable device 101. For example, when the user looks at the front, the wearable device 101 may naturally display environment information associated with the user's front on the at least one display 250 at a position where the user is positioned. The eye tracking camera 260-1 may be configured to capture an image of the user's pupil in order to determine the user's gaze. For example, the eye tracking camera 260-1 may receive gaze detection light reflected from the user's pupil and may track the user's gaze based on the position and movement of the received gaze detection light. In yet another embodiment, the eye tracking camera 260-1 may be disposed at a position corresponding to the user's left and right eyes. For example, the eye tracking camera 260-1 may be disposed in the first rim 201 and/or the second rim 202 to face the direction in which the user wearing the wearable device 101 is positioned.

The motion recognition camera 260-2 and 264 may provide a specific event to the screen provided on the at least one display 250 by recognizing the movement of the whole or portion of the user's body, such as the user's torso, hand, or face. The motion recognition camera 260-2 and 264 may obtain a signal corresponding to motion by recognizing the user's motion (e.g., gesture recognition), and may provide a display corresponding to the signal to the at least one display 250. The processor may identify a signal corresponding to the operation and may perform a preset function based on the identification. In yet another embodiment, the motion recognition camera 260-2 and camera 264 may be disposed on the first rim 201 and/or the second rim 202.

The camera 260 included in the wearable device 101 is not limited to the above-described eye tracking camera 260-1 and the motion recognition camera 260-2 and 264. For example, the wearable device 101 may identify an external object included in the FoV by using a camera 260 disposed toward the user's FoV. Identifying of the external object by the wearable device 101 may be performed based on a sensor for identifying a distance between the wearable device 101 and the external object, such as a depth sensor and/or a time of flight (ToF) sensor. The camera 260 disposed toward the FoV may support an autofocus function and/or an optical image stabilization (OIS) function. For example, in order to obtain an image including a face of the user wearing the wearable device 101, the wearable device 101 may include the camera 260 (e.g., a face tracking (FT) camera) disposed toward the face.

Although not illustrated, the wearable device 101 according to yet another embodiment may further include a light source (e.g., light emitting diode (LED)) that emits light toward a subject (e.g., user's eyes, face, and/or an external object in the FoV) photographed by using the camera 260. The light source may include an LED having an infrared wavelength. The light source may be disposed on at least one of the frame 200, and the hinge units 206 and 207.

According to yet another embodiment, the battery module 270 may supply power to electronic components of the wearable device 101. In yet another embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In yet another embodiment, the battery module 270 may be disposed at an end of the first temple 204 and/or the second temple 205.

The antenna module 275 may transmit the signal or power to the outside of the wearable device 101 or may receive the signal or power from the outside. In yet another embodiment, the antenna module 275 may be disposed in the first temple 204 and/or the second temple 205. For example, the antenna module 275 may be disposed close to one surface of the first temple 204 and/or the second temple 205.

A speaker 255 may output a sound signal to the outside of the wearable device 101. A sound output module may be referred to as a speaker. In yet another embodiment, the speaker 255 may be disposed in the first temple 204 and/or the second temple 205 in order to be disposed adjacent to the ear of the user wearing the wearable device 101. For example, the speaker 255 may include a second speaker 255-2 disposed adjacent to the user's left ear by being disposed in the first temple 204, and a first speaker 255-1 disposed adjacent to the user's right ear by being disposed in the second temple 205.

The light emitting module (not illustrated) may include at least one light emitting element. The light emitting module may emit light of a color corresponding to a specific state or may emit light through an operation corresponding to the specific state in order to visually provide information on a specific state of the wearable device 101 to the user. For example, when the wearable device 101 requires charging, it may emit red light at a constant cycle. In yet another embodiment, the light emitting module may be disposed on the first rim 201 and/or the second rim 202.

Referring to FIG. 2B, according to an embodiment, the wearable device 101 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by different blocks of FIG. 4) included in the wearable device 101 may be disposed. The wearable device 101 may include a flexible PCB (FPCB) for interconnecting the hardware.

According to another embodiment, the wearable device 101 may include at least one of a gyro sensor, a gravity sensor, and/or an acceleration sensor for detecting the posture of the wearable device 101 and/or the posture of a body part (e.g., a head) of the user wearing the wearable device 101. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 101 may identify the user's motion and/or gesture performed to execute or stop a specific function of the wearable device 101 based on the IMU.

Figure 3A:
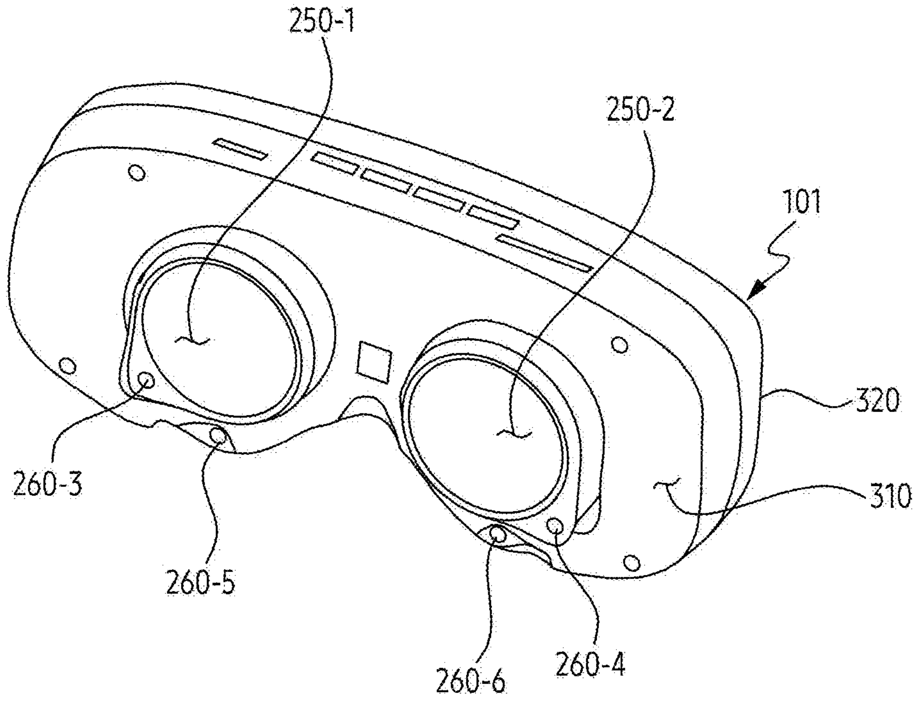
FIGS. 3A and 3B illustrate an example of an exterior of a wearable device according to various embodiments of the disclosure.
Figure 3B:
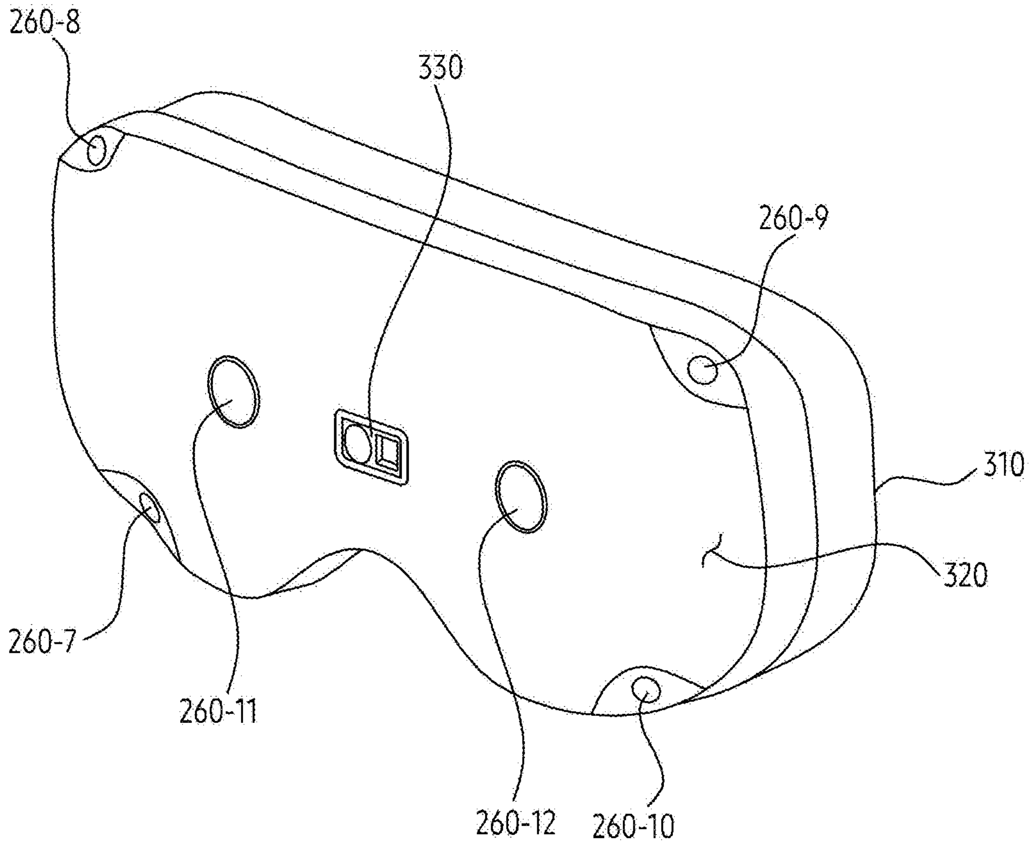

FIGS. 3A and 3B illustrate an example of an exterior of a wearable device according to various embodiments of the disclosure. A wearable device 101 of FIGS. 3A and 3B may be an example of the electronic device 101 of FIG. 1. According to an embodiment, an example of the exterior of a first surface 310 of the housing of the wearable device 101 may be illustrated in FIG. 3A, and an example of the exterior of a second surface 320 opposite to the first surface 310 may be illustrated in FIG. 3B.

Referring to FIG. 3A, according to an embodiment, the first surface 310 of the wearable device 101 may have an attachable shape on the user's body part (e.g., the user's face). Although not illustrated, the wearable device 101 may further include a strap for being fixed on the user's body part, and/or one or more temples (e.g., the first temple 204 and/or the second temple 205 of FIGS. 2A and 2B). A first display 250-1 for outputting an image to the left eye among the user's two eyes and a second display 250-2 for outputting an image to the right eye among the user's two eyes may be disposed on the first surface 310. The wearable device 101 may further include rubber or silicon packing, which are formed on the first surface 310, for preventing interference by light (e.g., ambient light) different from the light emitted from the first display 250-1 and the second display 250-2.

According to another embodiment, the wearable device 101 may include cameras 260-3 and 260-4 for photographing and/or tracking two eyes of the user adjacent to each of the first display 250-1 and the second display 250-2. The cameras 260-3 and 260-4 may be referred to as an ET camera. According to yet another embodiment, the wearable device 101 may include cameras 260-5 and 260-6 for photographing and/or recognizing the user's face. The cameras 260-5 and 260-6 may be referred to as a FT camera.

Referring to FIG. 3B, a camera (e.g., cameras 260-7, 260-8, 260-9, 260-10, 260-11, and 260-12), and/or a sensor (e.g., the depth sensor 330) for obtaining information associated with the external environment of the wearable device 101 may be disposed on the second surface 320 opposite to the first surface 310 of FIG. 3A. For example, the cameras 260-7, 260-8, 260-9, and 260-10 may be disposed on the second surface 320 in order to recognize an external object different from the wearable device 101. For example, by using cameras 260-11 and 260-12, the wearable device 101 may obtain an image and/or video to be transmitted to each of the user's two eyes. The camera 260-11 may be disposed on the second surface 320 of the wearable device 101 to obtain an image to be displayed through the second display 250-2 corresponding to the right eye among the two eyes. The camera 260-12 may be disposed on the second surface 320 of the wearable device 101 to obtain an image to be displayed through the first display 250-1 corresponding to the left eye among the two eyes.

According to an embodiment, the wearable device 101 may include the depth sensor 330 disposed on the second surface 320 in order to identify a distance between the wearable device 101 and the external object. By using the depth sensor 330, the wearable device 101 may obtain spatial information (e.g., a depth map) about at least a portion of the FoV of the user wearing the wearable device 101.

Although not illustrated, a microphone for obtaining sound outputted from an external object may be disposed on the second surface 320 of the wearable device 101. The number of microphones may be one or more according to an embodiment.

As described above, the wearable device 101 according to another embodiment may include hardware (e.g., cameras 240-11 and 240-12, and/or the depth sensor 330) for identifying a body part including a user's hand. The wearable device 101 may identify a gesture indicated by a motion of a body part. The wearable device 101 may provide a UI based on the identified gesture to a user wearing the wearable device 101. The UI may support a function for editing an image and/or video stored in the wearable device 101. The wearable device 101 may communicate with an external electronic device different from the wearable device 101, in order to more accurately identify the gesture.

Figure 4:
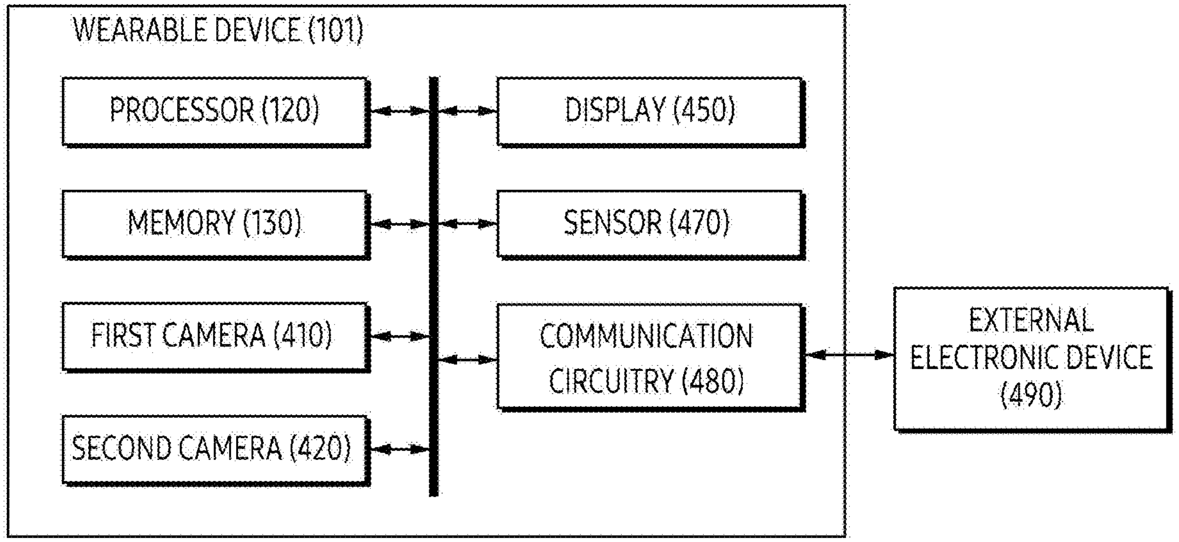
FIG. 4 illustrates a block diagram of a wearable device according to an embodiment of the disclosure.

FIG. 4 is a block diagram of a wearable device according to an embodiment of the disclosure. A wearable device 101 of FIG. 4 may be an example of the electronic device 101 of FIG. 1 and the wearable device 101 of FIGS. 2A and 2B. Referring to FIG. 4, a situation in which the wearable device 101 and an external electronic device 490 are connected to each other based on a wired network and/or a wireless network is illustrated. The wired network may include a network such as Internet, a local area network (LAN), a wide area network (WAN), Ethernet, or a combination thereof. The wireless network may include a network such as long term evolution (LTE), 5G new radio (NR), wireless fidelity (WiFi), Zigbee, near field communication (NFC), Bluetooth, bluetooth low-energy (BLE), or a combination thereof. Although it is illustrated that the wearable device 101 and the external electronic device 490 are directly connected, the wearable device 101 and the external electronic device 490 may be indirectly connected through one or more routers and/or access points (APs).

Referring to FIG. 4, according to an embodiment, the wearable device 101 may include at least one of a processor 120, memory 130, cameras 410 and 420, a display 450, a sensor 470, or communication circuitry 480. The processor 120, the memory 130, the cameras 410 and 420, the display 450, the sensor 470, and the communication circuitry 480 may be electronically and/or operably coupled with each other by an electronical component such as a communication bus. Hereinafter, hardware components being operably coupled may mean that a direct connection or an indirect connection between the hardware components is established by wire or wirelessly such that a second hardware component among the hardware components is controlled by a first hardware component. Although illustrated based on different blocks, another embodiment is not limited thereto, and a portion (e.g., at least a portion of the processor 120, the memory 130, and the communication circuitry 480) of the hardware components illustrated in FIG. 4 may be included in a single integrated circuit such as a system on a chip (SoC). A type and/or the number of hardware components included in the wearable device 101 is not limited as illustrated in FIG. 4. For example, the wearable device 101 may include only a portion of the hardware components illustrated in FIG. 4.

According to yet another embodiment, the processor 120 of the wearable device 101 may include a hardware component for processing data based on one or more instructions. For example, the hardware component for processing the data may include an arithmetic and logic unit (ALU), a floating point unit (FPU), a field programmable gate array (FPGA), and/or a central processing unit (CPU). The number of the processors 120 may be one or more. For example, the processor 120 may have a structure of a multi-core processor such as a dual core, a quad core, or a hexa core. The processor 120 of FIG. 4 may include the processor 120 of FIG. 1.

According to yet another embodiment, the memory 130 of the wearable device 101 may include a hardware component for storing the data and/or an instruction inputted to or outputted from the processor 120. The memory 130 may include, for example, volatile memory such as random-access memory (RAM), and/or non-volatile memory such as read-only memory (ROM). For example, the volatile memory may include at least one of a dynamic RAM (DRAM), a static RAM (SRAM), a Cache RAM, and a pseudo SRAM (PSRAM). The non-volatile memory may include at least one of, for example, a programmable ROM (PROM), an erasable PROM (EPROM), an electrically erasable PROM (EEPROM), flash memory, a hard disk, a compact disk, and an embedded multi media card (eMMC). The memory 130 of FIG. 4 may include the memory 130 of FIG. 1.

In the memory 130, one or more instructions indicating a calculation and/or an operation to be performed by the processor 120 on data may be stored. A set of one or more instructions may be referred to as firmware, an operating system, a process, a routine, a sub-routine and/or an application. For example, the wearable device 101 and/or the processor 120 may perform at least one of operations of FIG. 7, 9, or 11, when a set of a plurality of instructions distributed in a form of the operating system, the firmware, a driver, and/or the application is executed. Hereinafter, the application being installed in the wearable device 101 may mean that the one or more instructions provided in a form of the application are stored in the memory 130 of the wearable device 101, and the one or more applications are stored in an executable format (e.g., a file having an extension specified by the operating system of the wearable device 101).

Referring to FIG. 4, the one or more applications may be installed in the memory 130 of the wearable device 101. For example, the one or more instructions included in the one or more applications may be divided into an identifier for predicting a gaze of a user, a discriminator for discriminating a position corresponding to a direction of eyes and whether the gaze is corresponded, and/or a compensator for compensating the position corresponding to the direction of the eyes. For example, the wearable device 101 may predict whether the gaze of the user matches an external object (or a subject) displayed or shown within a FoV of the wearable device 101, in a state that the identifier is executed. An operation in which the wearable device 101 identifies the gaze of the user using the external object (e.g., a visual object) will be described later in FIGS. 6A to 6C.

For example, in a state that the discriminator is executed, the wearable device 101 may identify whether information indicating a direction of the eyes obtained using a second camera 420 matches information corresponding to the gaze of the user. In case that pieces of information match, the wearable device 101 may set accuracy of the information indicating the direction of the eyes to be higher. In case that pieces of information mismatch, the wearable device 101 may compensate the information indicating the direction of the eyes, using the information corresponding to the gaze of the user. The wearable device 101 may execute the compensator for compensating the information indicating the direction of the eyes. The wearable device 101 may provide a visual object indicating compensation to the user in a state that the compensator is executed. An operation in which the wearable device 101 performs the compensation will be described later in FIG. 5.

According to yet another embodiment, cameras 410 and 420 of the wearable device 101 may include one or more an optical sensor (e.g., a charged coupled device (CCD) sensor and a complementary metal oxide semiconductor (CMOS) sensor) that generate an electrical signal indicating color and/or brightness of light. A plurality of optical sensors included in the cameras 410 and 420 may be disposed in a form of a 2 dimensional array. The cameras 410 and 420 may correspond to light reaching the optical sensors of the 2 dimensional array by obtaining an electrical signal of each of the plurality of optical sensors substantially simultaneously, and generate an image including a plurality of pixels arranged in two dimensions. For example, photo data captured using the camera 440 may mean one image obtained from the cameras 410 and 420. For example, video data captured using cameras 410 and 420 may mean a sequence of a plurality of images obtained according to a specified frame rate from the cameras 410 and 420. According to yet another embodiment, the wearable device 101 may further include a flash light, disposed in a direction in which the cameras 410 and 420 receive the light, for outputting the light in the direction. The number of the cameras 410 and 420 included in the wearable device 101 may be one or more, as described above with reference to FIGS. 2A and 2B and/or FIGS. 3A and 3B.

According to yet another embodiment, the first camera 410 of the wearable device 101 may include a depth camera. The depth camera may include the flash light and/or an infrared diode that emits the light to the outside. The depth camera may include one or more infrared light sensors that detect intensity of infrared light. The depth camera may measure a degree to which the infrared light emitted from the infrared diode is reflected by using the one or more infrared light sensors. In yet another embodiment, the degree to which the infrared light is reflected may be measured substantially simultaneously by a plurality of infrared light sensors in the depth camera. The depth camera may generate frame data including a depth value based on the degree to which the infrared light measured by the plurality of infrared light sensors is reflected. The depth value may be related to a distance between a subject (or an external object) captured by the first camera 410 and the first camera 410. For example, position information of a visual object displayed on the display 450 may be obtained based on a distance of the subject. For example, the wearable device 101 may obtain the position information of the visual object based on a distance between the subject and the first camera 410 and/or the wearable device 101. For example, the position information of the visual object may mean a center point of the visual object.

According to yet another embodiment, the second camera 420 of the wearable device 101 may identify the eyes of the user wearing the wearable device 101. For example, the second camera 420 may be disposed toward the eyes of the user. The second camera 420 may be referred to the gaze tracking camera 260-1 of FIG. 2B. The wearable device 101 may infer the eyes direction of the user based on identifying a position of each of a pupil, a sclera, an iris, and/or a glint (e.g., gaze detection light reflected from the pupil), included in the eyes of the user, using the second camera 420. The wearable device 101 may infer the direction of the eyes of the user, located within the field-of-view (FoV) of the wearable device 101.

For example, the wearable device 101 may use a position of the visual object displayed on the display 450 to improve accuracy of the inferred direction of the eyes of the user. The wearable device 101 may change the inferred direction of the eyes to the position of the visual object by identifying the external object interacting with the visual object. According to yet another embodiment, the changed direction of the eyes by the wearable device 101 and the gaze of the user wearing the wearable device 101 may be substantially similar. For example, the wearable device 101 may identify the direction of the eyes of the user based on an optical axis using the second camera 420. The wearable device 101 may use the position of the visual object such that the direction of the eyes of the user matches at least a portion of a visual axis. However, it is not limited thereto.

In yet another embodiment, a FoV of the cameras 410 and 420 is an area formed based on a view angle in which lenses of the cameras 410 and 420 are capable of receiving light, and may correspond to an area corresponding to the image generated by the cameras 410 and 420. Hereinafter, the subject, the visual object, and/or the external object means an object included in the FoV of the cameras 410 and 420 and distinguished from the wearable device 101. In yet another embodiment, the FoV of the cameras 410 and 420 may at least partially match an environment shown to the user through the display 450, such as a FoV 510 of FIG. 5 to be described later. At least one of the cameras 410 and 420 may include the camera module 180 of FIG. 1.

According to yet another embodiment, the display 450 of the wearable device 101 may output visualized information to the user. The number of displays 450 included in the wearable device 101 may be one or more. For example, the display 450 may output visualized information to the user by being controlled by the processor 120 and/or a graphic processing unit (GPU) (not illustrated). The display 450 may include a flat panel display (FPD) and/or an electronic paper. The FPD may include a liquid crystal display (LCD), a plasma display panel (PDP), a digital mirror device (DMD), one or more light emitting diodes (LEDs), and/or micro LEDs. The LED may include an organic LED (OLED). The display 450 of FIG. 4 may include the display module 160 of FIG. 1.

In yet another embodiment, transmission of light may occur in at least a portion of the display 450. The wearable device 101 may provide a user experience related to augmented reality by providing a combination of the light outputted through the display 450 and the light transmitted through the display 450 to the user. As described above with reference to FIGS. 2A and 2B and/or 3A and 3B, according to an embodiment, the display 450 of the wearable device 101 may have a structure for covering the entire field-of-view (FoV) of the user or emitting the light toward the FoV, in a state of being worn on a body part of the user such as a head.

Although not illustrated, the wearable device 101 may include another output means for outputting information in a form other than a visual form and an auditory form. For example, the wearable device 101 may include at least one speaker for outputting an audio signal, and/or a motor (or actuator) for providing haptic feedback based on vibration.

According to yet another embodiment, the sensor 470 of the wearable device 101 may generate electronic information that may be processed by the processor 120 and/or the memory 130 from non-electronic information related to the wearable device 101. The electronic information generated by the sensor 470 may be stored in the memory 130, processed by the processor 120, and/or transmitted to another electronic device distinguished from the wearable device 101. An embodiment of the wearable device 101 is not limited to a type and/or the number of one or more sensors exemplified in FIG. 4. For example, the sensor 470 may further include a grip sensor capable of identifying a contact between the wearable device 101 and an external object (e.g., a user), and/or a gyro sensor or an acceleration sensor capable of identifying a movement of the wearable device 101.

According to yet another embodiment, the communication circuitry 480 of the wearable device 101 may include hardware for supporting transmission and/or reception of an electrical signal between the wearable device 101 and the external electronic device 490. For example, the external electronic device 490 may include at least one server. The wearable device 101 may obtain, or share position information of one or more users in a space where the wearable device 101 is included, using the at least one server.

The communication circuitry 480 may include, for example, at least one of a MODEM, an antenna, and an optic/electronic (O/E) converter. The communication circuitry 480 may support the transmission and/or the reception of the electrical signal based on various types of protocols such as ethernet, a local area network (LAN), a wide area network (WAN), wireless fidelity (WiFi), Bluetooth, Bluetooth low energy (BLE), ZigBee, long term evolution (LTE), and 5G new radio (NR). The communication circuitry 460 of FIG. 4 may include the communication module 190 and/or the antenna module 197 of FIG. 1.

As described above, according to yet another embodiment, the wearable device 101 may display the visual object within the field-of-view (FoV) of the wearable device 101 using the display 450. The wearable device 101 may identify an interaction between the visual object and the at least one external object by using the first camera 410. The wearable device 101 may compensate for information indicating the direction of the eyes of the user obtained by using the second camera 420, based on position information of the at least one external object and/or visual object, by identifying the interaction. The wearable device 101 may provide a more realistic augmented reality service to the user within the FoV based on compensating for the information.

Figure 5:
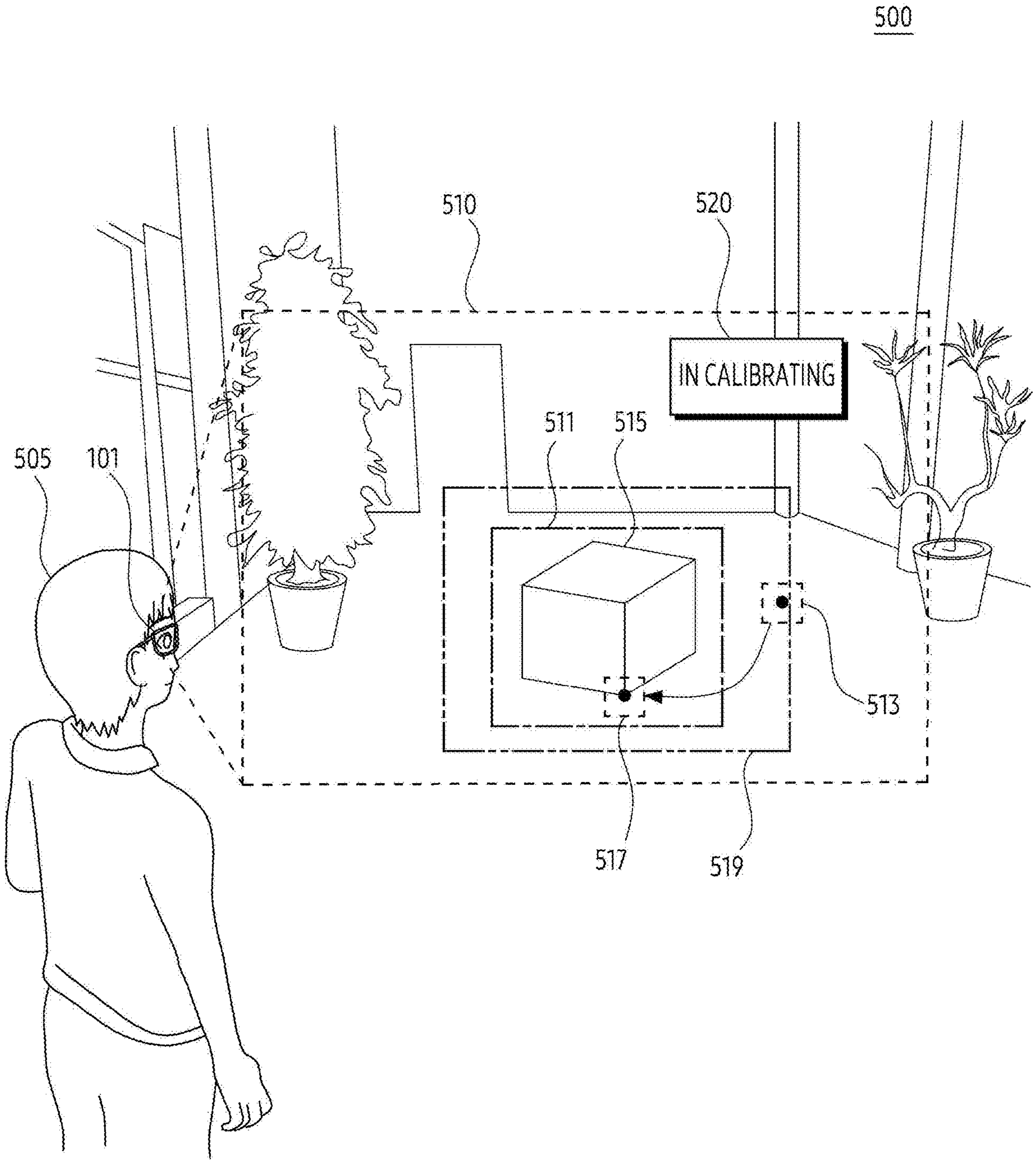
FIG. 5 illustrates an example of an operation in which a wearable device changes information indicating a direction of eyes of a user according to an embodiment of the disclosure.

FIG. 5 illustrates an example of an operation in which a wearable device changes information indicating a direction of eyes of a user according to an embodiment of the disclosure. A wearable device 101 of FIG. 5 may include the electronic device 101 of FIG. 1 and/or the wearable device 101 of FIGS. 2A, 2B, 3A, 3B, and 4. Referring to FIG. 5, according to an embodiment, a state 500 in which the wearable device 101 displays a visual object 515 within a FoV 510 of a user 505 is illustrated.

Referring to FIG. 5, according to an embodiment, the wearable device 101 may display the visual object 515 within the FoV 510 using a display (e.g., the display 450 of FIG. 4). For example, the visual object 515 may be referred to a virtual object generated by the wearable device 101 to identify a direction (or a gaze of the user) of eyes of the user 505. A size and/or a type of the visual object 515 may vary according to an embodiment.

For example, the wearable device 101 may identify an area 511 in which the visual object 515 is displayed within the FoV 510 by displaying the visual object 515. The area 511 may include position information of the visual object 515 within the FoV 510. For example, the position information of the visual object 515 may mean a center point of the visual object 515. For example, the wearable device 101 may obtain information corresponding to the area 511. The information may indicate a probability that the direction of the eyes of the user 505 corresponds to at least a portion of the area 511. For example, the information may be obtained based on a feature map (e.g., a saliency map). For example, the wearable device 101 may obtain probability information in which the gaze of the user 505 matches an external object displayed or shown within the FoV 510 using the feature map. However, it is not limited thereto.

According to yet another embodiment, based on displaying the visual object 515, the wearable device 101 may identify information indicating the direction of the eyes of the user 505 looking at the visual object 515 using a second camera 420. For example, the information indicating the direction of the eyes may be identified by frames obtained by using the second camera 420. For example, the information may be composed of one or more parameters. The wearable device 101 may identify a first position 513 corresponding to the information within the FoV 510. For example, the first position 513 may be a position identified based on an optical axis of the eyes of the user 505.

For example, the wearable device 101 may identify an external object that interacts with the visual object 515 based on a first camera (e.g., the first camera 410 of FIG. 4). The wearable device 101 may identify a second position 517 interacting with the visual object 515 and the external object. The second position 517 may be included in the area 511. For example, an operation in which the wearable device 101 identifies the interaction will be described later in FIGS. 6A to 6C.

According to yet another embodiment, the wearable device 101 may identify a difference between the second position 517 and the first position 513 within the FoV 510 based on identifying the second position 517. The wearable device 101 may identify that a position corresponding to the gaze of the user 505 matches the second position 517, based on identifying the difference less than a specified threshold 519. The position corresponding to the gaze of the user 505 may be an example of a position based on a visual axis of the eyes of the user. The specified threshold may mean a specified distance between the first position 513 and the second position 517. The wearable device 101 may obtain a probability (e.g., 0 to 1) value that the gaze of the user corresponds to the second position 517 using the specified threshold. For example, in case that the distance between the second position 517 and the first position 513 is less than the specified threshold, the wearable device 101 may identify a probability value corresponding to the second position 517 as '1'. However, it is not limited thereto.

For example, the wearable device 101 may identify the difference between the second position 517 and the first position 513 that is equal to or more than the specified threshold 519. The wearable device 101 may display a visual object indicating calibration, using the display, based on identifying the difference. The operation of displaying the visual object will be described later in FIG. 8.

According to yet another embodiment, the wearable device 101 may change the information indicating the direction of the eyes of the user 505, based on identifying the difference between the second position 517 and the first position 513 that is less than the specified threshold 519. For example, the wearable device 101 may change the information using the second position 517. The wearable device 101 may map the information to correspond to the second position 517. The wearable device 101 may compensate the first position 513 corresponding to the direction of the user obtained by using the second camera 420 using the second position 517. For example, the wearable device 101 may calibrate the first position 513 to the second position 517.

For example, the wearable device 101 may identify the second position 517 at which the interaction between the visual object 515 and the external object occurs, in first frames obtained by using the first camera 410. The wearable device 101 may obtain the information indicating the direction of the eyes of the user in the obtained second frames using the second camera 420. The information may include a first position 513. The wearable device 101 may accumulate data indicating the second position 517 included in each of the first frames and data indicating the first position 513 included in each of the second frames. The wearable device 101 may perform calibration based on the accumulated data. For example, while performing the calibration, the wearable device 101 may display a visual object 520 indicating the calibration within the FoV 510, using the display. The wearable device may indicate the calibration to the user using the visual object 520.

As described above, according to yet another embodiment, the wearable device 101 may identify whether the obtained information indicating the direction of the eyes and the information indicating the interaction matches by using the second camera 420. For example, the wearable device 101 may improve reliability of an operation of matching a gaze position of the user to the second position 517 by obtaining data indicating whether the matches. Based on the improved reliability, the wearable device 101 may more accurately provide position information corresponding to the gaze of the user within the FoV 510 of the user wearing the wearable device 101.

Hereinafter, in FIGS. 6A to 6C, an operation in which the wearable device 101 identifies the interaction between the external object and the visual object will be described later.

Figure 6A:
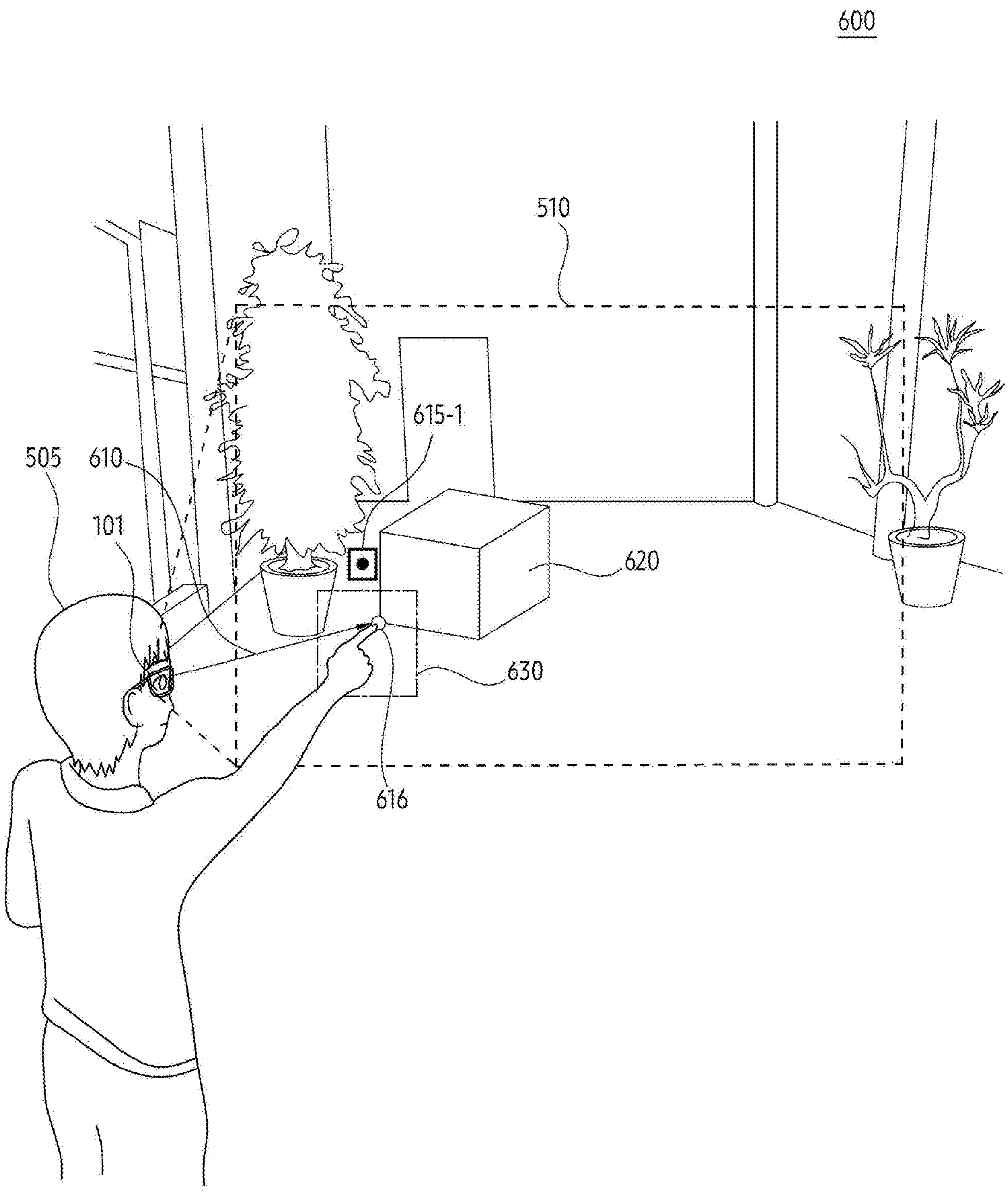
FIGS. 6A, 6B, and 6C illustrate interactions using an external object identified by a wearable device according to various embodiments of the disclosure.
Figure 6B:
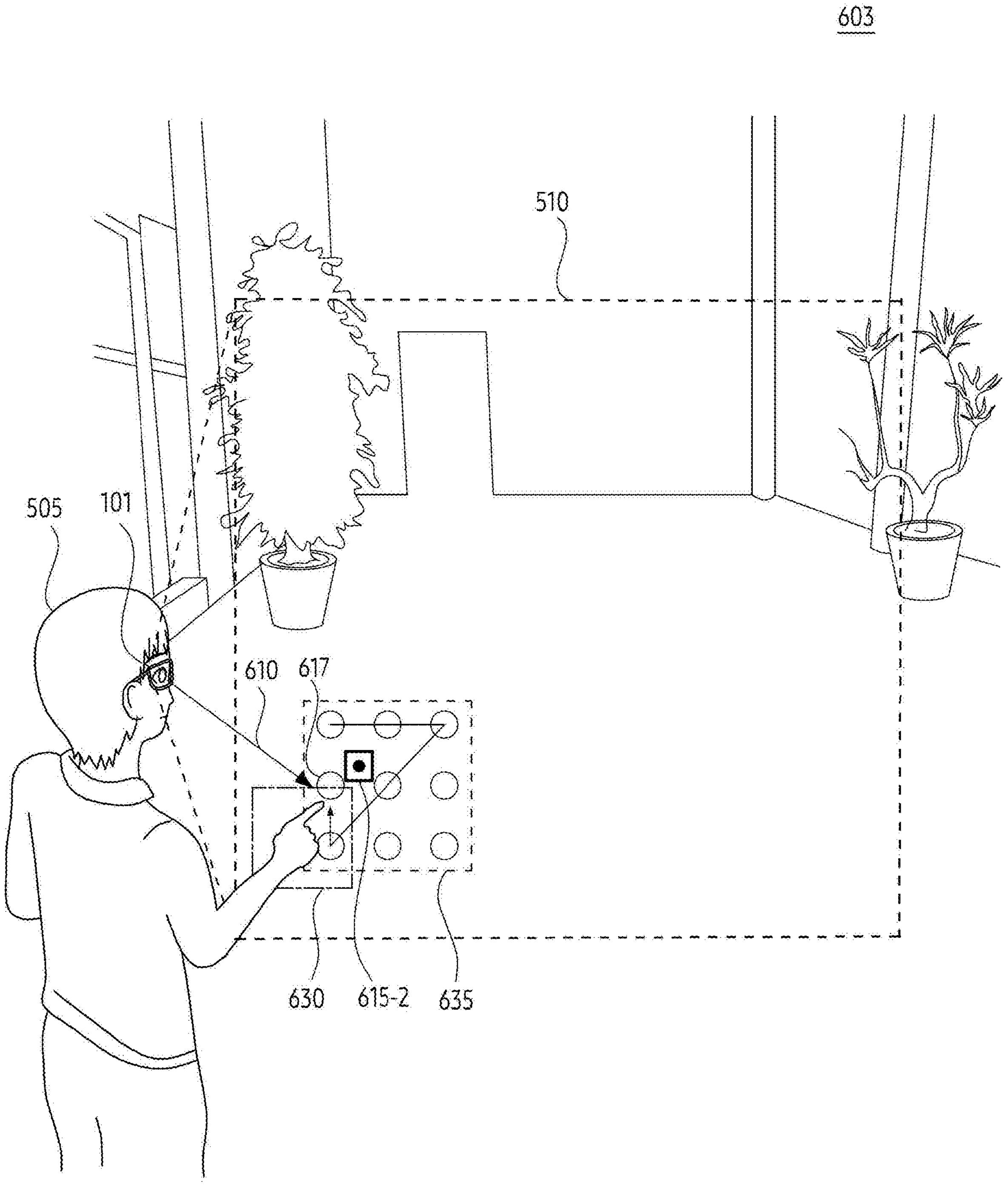
Figure 6C:
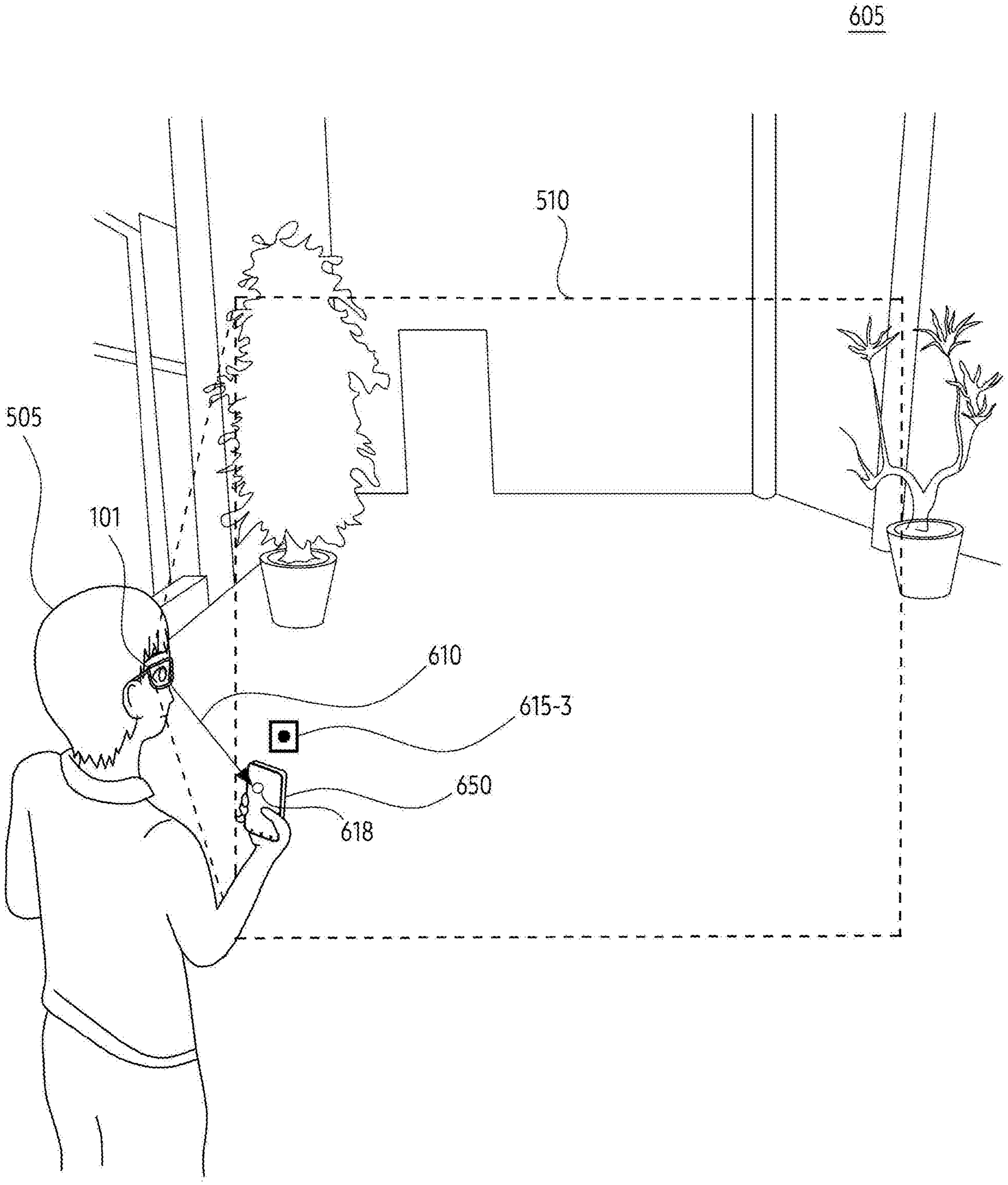

FIGS. 6A to 6C illustrate interactions using an external object identified by a wearable device according to various embodiments of the disclosure. A wearable device 101 of FIGS. 6A to 6C may be an example of the electronic device 101 of FIG. 1 and/or the wearable device 101 of FIGS. 2A, 2B, 3A, 3B, 4, and 5. For example, positions 615-1, 615-2, and 615-3 obtained by the wearable device 101 using a second camera (e.g., the second camera 420 of FIG. 4) may be referred to the first position 513 of FIG. 5. In FIGS. 6A to 6C, it is assumed a difference between each of positions 616, 617, and 618 corresponding to gaze of a user 505 and each of the positions 615-1, 615-2, and 615-3 is less than a specified threshold (e.g., the specified threshold 519 of FIG. 5).

Referring to FIG. 6A, according to an embodiment, a state 600 where the wearable device 101 displays a visual object 620 within a FoV 510 is illustrated.

According to an embodiment, the wearable device 101 may identify at least one hand 630 of the user 505 of the wearable device 101 while displaying the visual object 620 in the state 600. For example, the wearable device 101 may identify the at least one hand 630 using a first camera (e.g., the first camera 410 of FIG. 4). The wearable device 101 may track the at least one hand 630 shown within the FoV 510.

According to another embodiment, the wearable device 101 may identify an interaction between the visual object 620 and the at least one hand 630 while tracking the at least one hand 630. For example, the wearable device 101 may identify a first gesture indicating the at least one hand 630 pointing the visual object 620. For example, the wearable device 101 may identify a visual object 620 matching a direction of a fingertip included in the at least one hand 630. For example, the wearable device 101 may identify a second gesture indicating the at least one hand 630 gripping the visual object 620. For example, the at least one hand 630 may be referred to at least one of the external objects, shown through the FoV 510 of the user.

For example, the wearable device 101 may identify the visual object 620 matching a direction of the at least one hand 630. However, the interaction between the visual object and the external object is not limited to the above-described embodiment. For example, the wearable device 101 may identify an interaction by tracking an external object different from the at least one hand 630.

According to yet another embodiment, the wearable device 101 may identify that the position 616 corresponding to gaze 610 of the user 505 matches a first position of the visual object 620 and/or a second position of the at least one hand 630 based on identifying the interaction. For example, the wearable device 101 may compensate for the position 615-1 (e.g., a position included in information indicating a direction of eyes) obtained using a second camera 420 based on the first position and/or the second position.

Referring to FIG. 6B, according to an embodiment, the wearable device 101 may display a visual object 635 within the FoV 510 in a state 603. For example, the visual object 635 may be used to identify the at least one hand 630 of the user 505 of the wearable device 101. For example, the wearable device 101 may induce a specified gesture of the user 505 using the visual object 635. The specified gesture may be an example of an unlock pattern of the wearable device 101. For example, the wearable device 101 may display a screen based on at least one application, using a display, by identifying the specified gesture.

For example, the wearable device 101 may identify the gaze 610 of the user 505 based on identifying the at least one hand 630 based on the specified gesture. The wearable device 101 may infer the gaze 610 of the user 505 based on identifying the at least one hand 630 at the ending position 617 included in the specified gesture. For example, the wearable device may change some of information (e.g., the position 615-2) indicating a direction of eyes based on a position of the at least one hand 630.

Referring to FIG. 6C, according to an embodiment, the wearable device 101 may identify an external electronic device 650 within the FoV 510 in a state 605. For example, the wearable device 101 may establish a communication link using the external electronic device 650 and communication circuitry (e.g., the communication circuitry 480 of FIG. 4). While establishing the communication link, the wearable device 101 may receive position information of the external electronic device 650 from the external electronic device 650. For example, the wearable device 101 may obtain the position 618 corresponding to the gaze 610 of the user based on identifying the external electronic device 650 within the FoV 510. For example, the obtained position may be referred to a position of the external electronic device 650.

For example, the wearable device 101 may obtain information indicating the direction of the eyes of the user 505 using the second camera (e.g., the second camera 420 of FIG. 4). The information indicating the direction of the eyes may include information indicating the position 615-3 within the FoV 510. For example, the wearable device 101 may change the information indicating the direction of the eyes based on identifying the external electronic device 650. For example, the wearable device 101 may change the position 615-3 to the position 618 corresponding to the gaze 610 of the user.

As described above, the wearable device 101 may identify an external object (e.g., the visual object 620, the at least one hand 630, or the external electronic device 650) that is shown or displayed within the FoV 510. The user of the wearable device 101 may gaze at a position corresponding to the external object. For example, the gaze of the user may be matched with the position corresponding to the external object. For example, the information indicating the direction of the eyes obtained by the wearable device 101 using the second camera 420 and the gaze of the user may be substantially different. The wearable device 101 may improve a user experience for an augmented reality service by changing the information indicating the direction of the eyes using the position corresponding to the external object.

Figure 7:
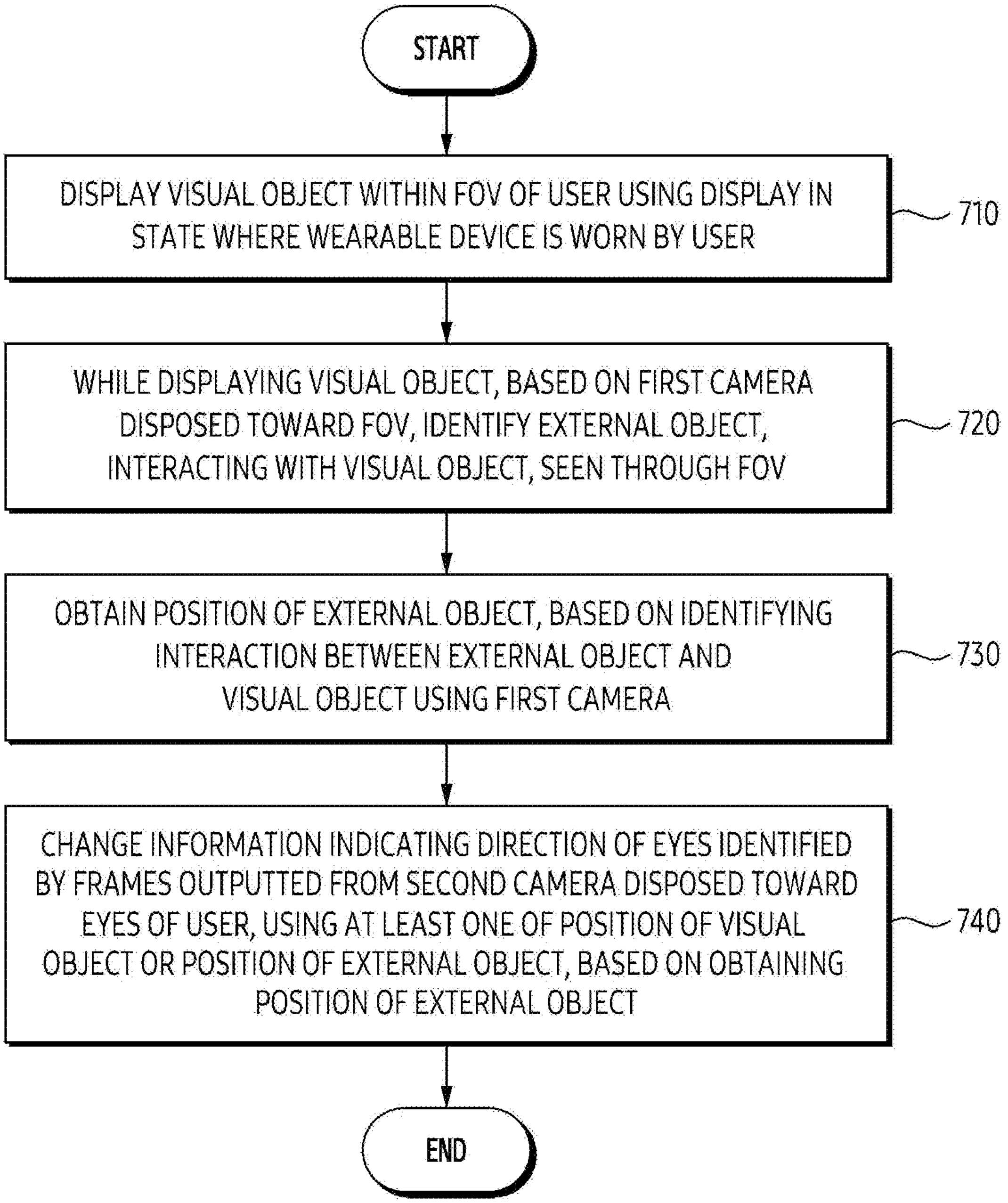
FIG. 7 is a flowchart illustrating an operation of a wearable device according to an embodiment of the disclosure.

FIG. 7 is a flowchart illustrating an operation of a wearable device according to an embodiment of the disclosure. At least one of operations of FIG. 7 may be performed by the electronic device 101 of FIG. 1, the wearable device 101 of FIGS. 2A, 2B, 3A, 3B, 4, 5, and 6A to 6C, and/or the processor 120 of FIG. 4.

Referring to FIG. 7, in an operation 710, according to an embodiment, the wearable device may display a visual object within a FoV (e.g., the FoV 510 of FIG. 5) of a user using a display (e.g., the display 450 of FIG. 4) in a state where the wearable device is worn by the user (e.g., the user 505 of FIG. 5). For example, the visual object may be an example of the visual object 515 of FIG. 5, the visual object 620 of FIG. 6A, and/or the visual object 635 of FIG. 6B.

Referring to FIG. 7, in an operation 720, according to an embodiment, the wearable device may, while displaying the visual object, based on a first camera disposed toward the FoV, identify an external object, interacting with the visual object, seen through the FoV. The first camera may be referred to the first camera 410 of FIG. 4. For example, a wearable device 101 may track the external object using a first camera 410. The external object may be seen by the FoV of the user, to the user. For example, the external object may include an external electronic device (e.g., the external electronic device 650 of FIG. 6C) and/or at least one hand (e.g., the at least one hand 630 of FIG. 6A). An interaction may mean a gesture of the external object indicating the visual object. The interaction may mean a gesture of the external object gripping the visual object. However, it is not limited thereto.

Referring to FIG. 7, in an operation 730, according to an embodiment, the wearable device may obtain a position of the external object, based on identifying an interaction between the external object and the visual object using the first camera. For example, the wearable device may display a visual object, which is a virtual object used to identify gaze of the user, in the display. The wearable device may identify the position of the external object using a position where the visual object is displayed in the display. For example, based on identifying the interaction between the visual object and the external object, the wearable device may identify that the gaze of the user matches a position where the interaction occurs.

Referring to FIG. 7, in an operation 740, according to an embodiment, the wearable device may change information indicating a direction of eyes identified by frames outputted from the second camera disposed toward the eyes of the user, using at least one of a position of the visual object or the position of the external object, based on obtaining the position of the external object. For example, the information indicating the direction of the eyes may include position information corresponding to an area included in a FoV. For example, the wearable device may change the information based on identifying the interaction between the visual object and the external object. For example, the wearable device may change the information using a point where the interaction occurred within the FoV. For example, the wearable device may change the information using the position of the external object. For example, the wearable device may adjust a position matching the direction of the eyes obtained using the information within the FoV. However, it is not limited thereto.

Figure 8:
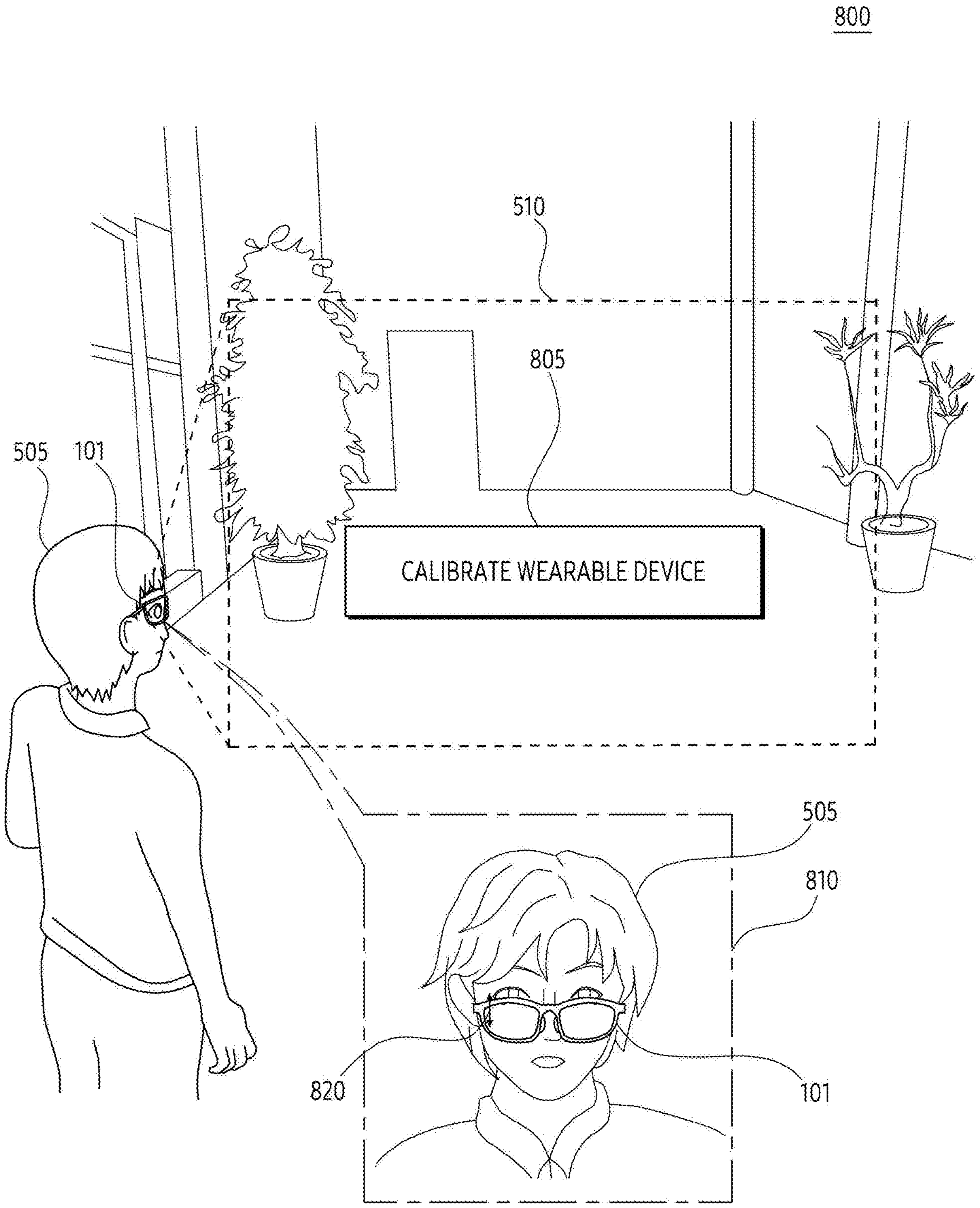
FIG. 8 illustrates a visual object displayed on a display by a wearable device according to an embodiment of the disclosure.

FIG. 8 illustrates a visual object displayed on a display by a wearable device according to an embodiment of the disclosure. A wearable device 101 of FIG. 8 may include the electronic device 101 of FIG. 1 and/or the wearable device 101 of FIGS. 2A, 2B, 3A, 3B, 4, 5, 6A to 6C, and 7.

Referring to FIG. 8, according to an embodiment, a state 800 where a wearable device 101 displays a visual object 805 in the state 800 is illustrated. According to an embodiment, the wearable device 101 may identify an area 511 in which a visual object 515 of FIG. 5 is displayed. The wearable device 101 may identify the position information of the visual object 515 of FIG. 5, using the area 511. The wearable device 101 may identify a difference between a position of the visual object (e.g., the visual object 515 of FIG. 5) and the first position 513 of FIG. 5, which is equal to or more than a specified threshold (e.g., the specified threshold 519 of FIG. 5). For example, the wearable device 101 may identify a wearing state 810 of the wearable device 101 based on identifying the difference, which is equal to or more than the specified threshold.

For example, the wearing state 810 may mean a state in which the wearable device 101 is worn by a user 505. The wearable device 101 may identify a distance 820 from eyes (or a pupil) of the user using a second camera (e.g., the second camera 420 of FIG. 4) in the wearing state 810. The wearable device 101 may identify a direction of the eyes of the user 505 in the wearing state 810. For example, the wearable device 101 may identify the direction of the eyes based on a part of the eyes of the user 505 identified in the wearing state 810. For example, the wearable device 101 may identify a position corresponding to the direction of the eyes within a FoV 510 based on identifying the direction of the eyes. The identified position may be disposed at a distance equal to or more than the specified threshold (e.g., the specified threshold 519 of FIG. 5) from the position of the visual object (e.g., the visual object 515 of FIG. 5) displayed within the FoV 510. For example, the wearing state 810 may be a state in which the wearable device 101 slips from a part (e.g., the eyes or a nose) of the user 505. However, it is not limited to the above-described embodiment.

According to another embodiment, the wearable device 101 may guide a change in a positional relationship between the wearable device 101 and the eyes of the user 505 based on identifying the wearing state 810. In order to perform the guide, the wearable device 101 may display the visual object 805 within the FoV 510 using the display.

As described above, according to yet another embodiment, the wearable device 101 may identify the wearing state 810 of the wearable device 101 by identifying a distance between a position indicating the direction of the eyes of the user 505, and a position of an external object displayed within the FoV 510, which is equal to or more than a specified threshold (e.g., the specified threshold 519 of FIG. 5).

The wearable device 101 may display, to the user, the visual object 805 indicating calibration of the wearable device 101 within the FoV 510 using a display (e.g., the display 450 of FIG. 4), based on the identified state. For example, the wearable device 101 may provide an augmented reality service based on more accurate gaze information by inducing the user to calibrate the wearable device 101.

Figure 9:
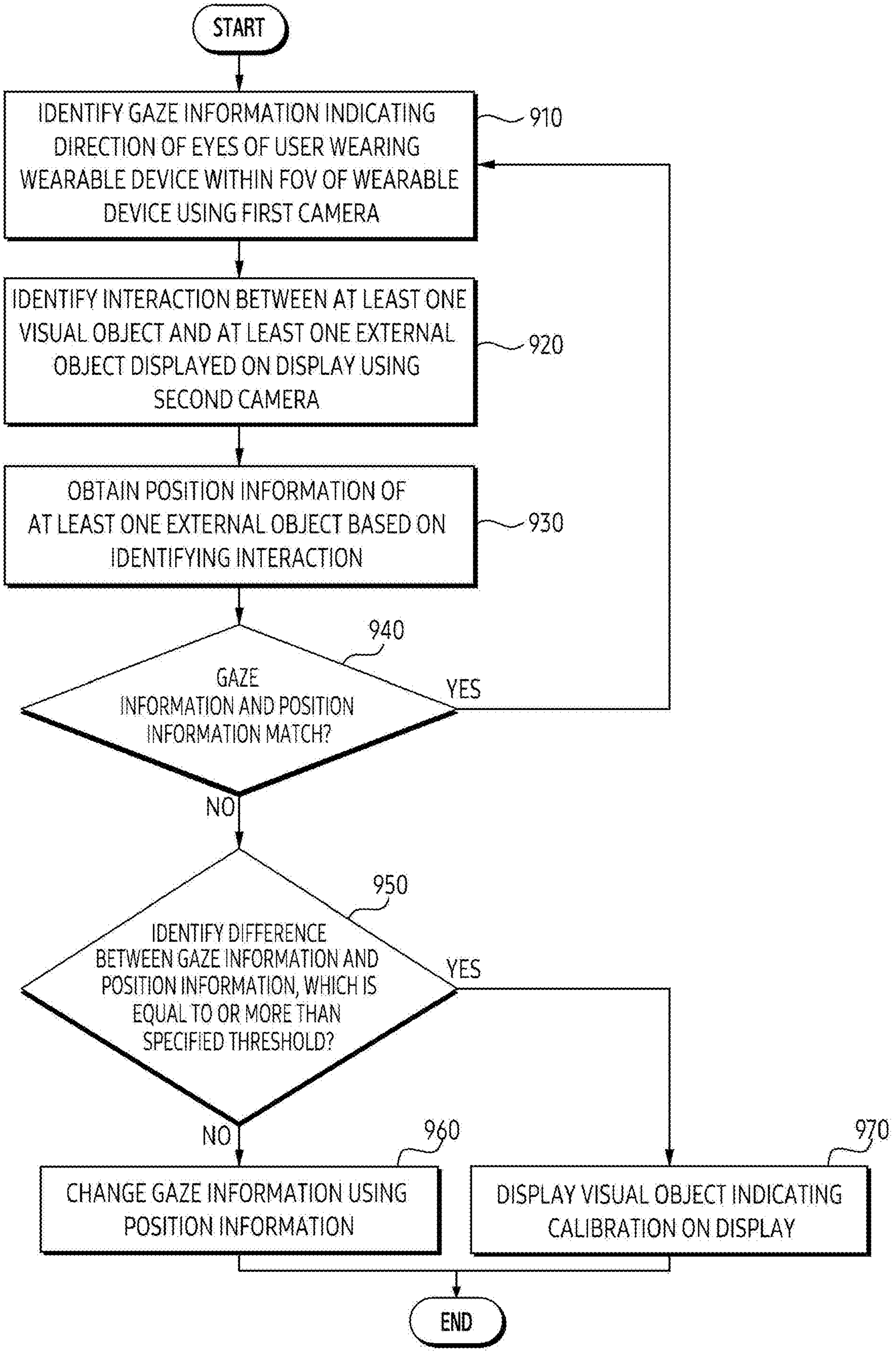
FIG. 9 is a flowchart illustrating an operation of a wearable device according to an embodiment of the disclosure.

FIG. 9 is a flowchart illustrating an operation of a wearable device according to an embodiment of the disclosure. At least one of operations of FIG. 9 may be performed by the electronic device 101 of FIG. 1, the wearable device 101 of FIGS. 2A, 2B, 3A, 3B, 4, 5, 6A to 6C, 7, and 8, and/or the processor 120 of FIG. 4.

Referring to FIG. 9, in an operation 910 according to an embodiment, the wearable device according to an embodiment may identify gaze information indicating a direction of eyes of a user wearing the wearable device within a FoV of the wearable device using a first camera. According to another embodiment, the wearable device may obtain gaze the information indicating the direction of the eyes of the user within the FoV (e.g., the FoV 510 of FIG. 5) using the first camera (e.g., the second camera 420 of FIG. 4). For example, the gaze information may be referred to the first position 513 of FIG. 5. The gaze information may mean a position where the direction of the eyes matches at least one area within the FoV.

Referring to FIG. 9, in an operation 920 according to an embodiment, the wearable device according to an embodiment may identify an interaction between at least one visual object and at least one external object displayed on a display using a second camera. According to yet another embodiment, the wearable device may identify an interaction between at least one visual object (e.g., the visual object 620 of FIG. 6A) and at least one external object (e.g., the at least one hand 630 of FIG. 6A) displayed on the display (e.g., the display 450 of FIG. 4) using the second camera (e.g., the first camera 410 of FIG. 4). For example, the interaction may mean that the at least one visual object and at least a portion of the at least one external object match. However, it is not limited thereto.

Referring to FIG. 9, in an operation 930 according to an embodiment, the wearable device according to an embodiment may obtain position information of the at least one external object based on identifying the interaction. For example, the position information of the at least one external object may mean a center point of the at least one external object. The position information may mean fingertips included in the at least one hand 630 of FIG. 6A. For example, the wearable device may obtain position information of at least one visual object based on identifying the interaction. The position information of the at least one visual object may include information substantially similar to the position information of the at least one external object.

Referring to FIG. 9, in an operation 940 according to an embodiment, the wearable device according to an embodiment may identify whether gaze information and the position information match. In case that the gaze information and the position information match (the operation 940—YES), the wearable device according to another embodiment may perform the operation 910. For example, the wearable device may obtain gaze information including first data indicating a position (e.g., the first position 513 of FIG. 5) based on first frames obtained using the first camera (e.g., the second camera 420 of FIG. 4). The wearable device may obtain position information including second data indicating a position (e.g., the second position 517 of FIG. 5) based on the second frames obtained using the second camera (e.g., the first camera 410 of FIG. 4). The wearable device may identify positions included in each of the first data and the second data, during a specified time. For example, the wearable device may improve a probability (e.g., 0 to 1) indicating whether the gaze information and the position information match by identifying the positions during the specified time. The wearable device may identify whether the gaze information and the position information match, based on the improved probability, after the specified time.

Referring to FIG. 9, in case that the gaze information and the position information do not match (the operation 940-NO), in an operation 950, the wearable device according to an embodiment may check whether a difference between the gaze information and the position information, which is equal to or more than the specified threshold, is identified. The specified threshold may mean a distance between the gaze information and the position information.

For example, in case that a difference between the gaze information and the position information, which is less than the specified threshold, is identified (the operation 950-NO), the wearable device according to another embodiment may change the gaze information using the position information in an operation 960. The wearable device may map the gaze information to the position information. For example, the wearable device may change the gaze information using mapping data based on three dimensions. The wearable device may display a visual object 520 within the FoV (e.g., the FoV 510 of FIG. 5), while changing the gaze information. The wearable device may notify the user of the change in the gaze information by displaying the visual object.

For example, in case that the difference between the gaze information and the position information, which is equal to or more than the specified threshold, is identified (the operation 950—YES), the wearable device according to an embodiment may display a visual object indicating calibration on the display, in an operation 970. The visual object indicating the calibration may be referred to the visual object 805 of FIG. 8. The wearable device may guide the calibration of the user using the visual object.

Figure 10:
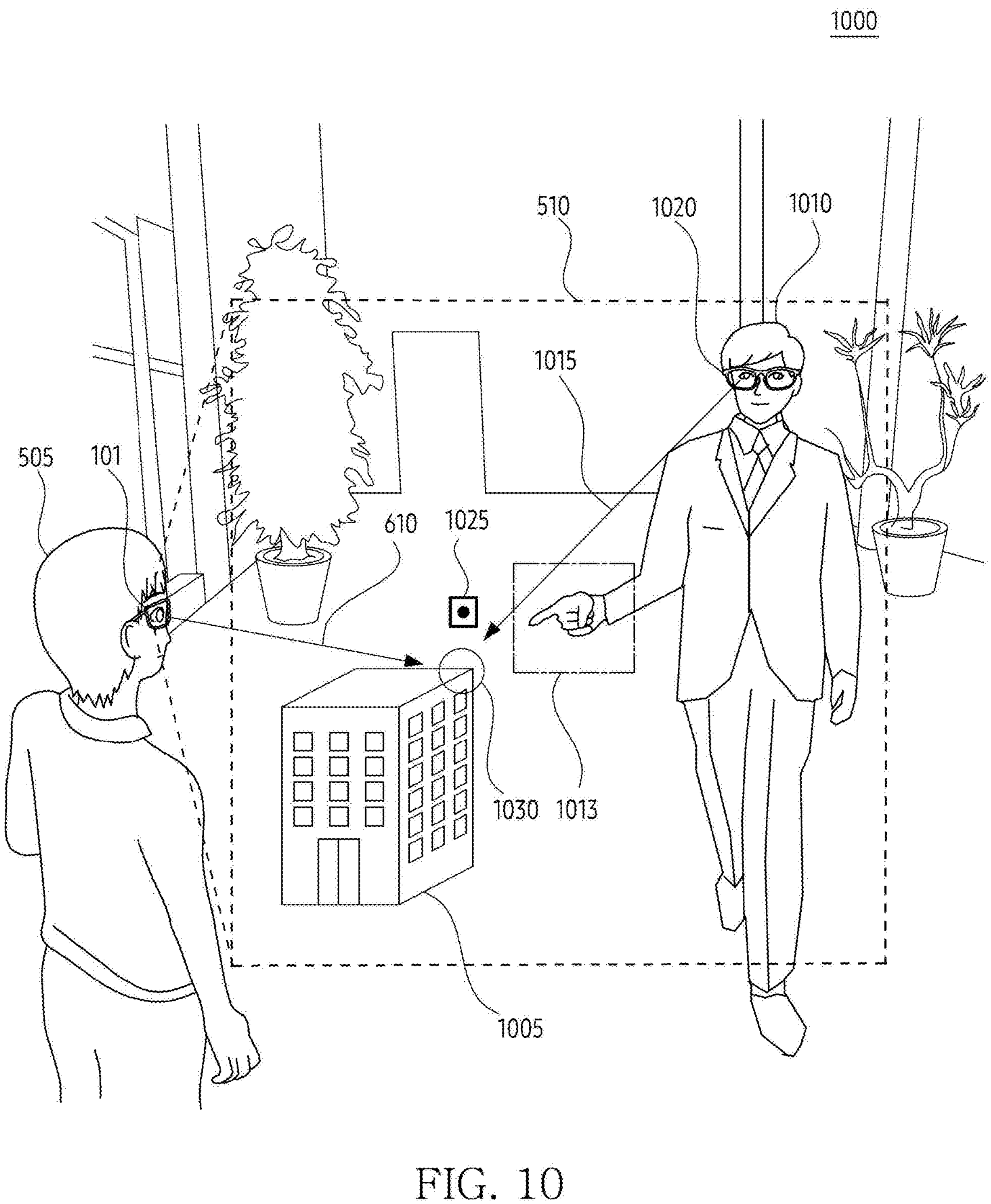
FIG. 10 illustrates an operation in which a wearable device identifies an interaction between a visual object and another user different from a user wearing the wearable device according to an embodiment of the disclosure.

FIG. 10 illustrates an operation in which a wearable device identifies an interaction between a visual object and another user different from a user wearing the wearable device according to an embodiment of the disclosure. A wearable device 101 of FIG. 10 may be an example of the electronic device 101 of FIG. 1 and/or the wearable device 101 of FIGS. 2A, 2B, 3A, 3B, 4, 5, 6A to 6C, and 7 to 9.

Referring to FIG. 10, a state 1000 in which the wearable device 101 identifies another user 1010 different from a user 505 is illustrated within a FoV 510. For example, the state 1000 may include a coworking space shared by one or more users 505 and 1010. However, it is not limited thereto.

According to an embodiment, the wearable device 101 may establish a communication link with an external electronic device (e.g., the external electronic device 490 of FIG. 4) by using communication circuitry (e.g., the communication circuitry 480 of FIG. 4) in the state 1000. For example, the external electronic device may include at least one server. The at least one server may provide a usable network environment in a space where the wearable device 101 is included. For example, the wearable device 101 may receive position information of the wearable device 101 from the at least one server in the space. The wearable device 101 may obtain information indicating a direction of eyes of a user within the FoV 510, using the received position information of the wearable device 101. The information indicating the direction of the eyes may mean a position 1025. For example, the wearable device may establish a communication link different from an external wearable device 1020 using the communication circuitry, the wearable device 101 and the external wearable device may identify each position information using the other communication link. However, it is not limited thereto.

According to another embodiment, the wearable device 101 may display a visual object 1005 within the FoV 510 in the state 1000 using a display (e.g., the display 450 of FIG. 4). For example, the wearable device 101 may share or transmit position information of the visual object 1005 with the external wearable device 1020 in the space where the wearable device 101 is included.

For example, the wearable device 101 may identify an interaction between the user 1010 and the visual object 1005 based on identifying the user1010. The wearable device 101 may identify an interaction between at least one hand 1013 of the user 1010 and the visual object 1005. For example, the interaction may include a gesture indicating the at least one hand 1013 pointing the visual object 1005. The interaction may include a gesture indicating the at least one hand 1013 gripping the visual object 1005.

For example, the wearable device 101 may identify a point 1030 of the visual object 1005 matching gaze 1015 of the user 1010. The wearable device 101 may identify the interaction based on identifying a point of the visual object 1005 matching the gaze 1015.

According to yet another embodiment, the wearable device 101 may change information indicating the direction of the eyes of the user based on identifying the interaction between the user 1010 and the visual object 1005 within the FoV 510. For example, the wearable device 101 may change the position 1025. The wearable device 101 may change the position 1025 using the position information of the visual object 1005. For example, the position information of the visual object 1005 may include a center point of the visual object 1005 and/or a point 1030 where the interaction occurs. The point 1030 may match the gaze 1015 of the user 1010. The point 1030 may match the gaze 610 of the user 505. However, it is not limited thereto. For example, in case that a distance of at least one point included in the position 1025 and the position information of the visual object 1005 is less than a specified threshold, the wearable device 101 may change the information indicating the direction of the eyes. For example, in case that the distance is equal to or more than the specified threshold, the wearable device 101 may display the visual object 805 of FIG. 8 within the FoV 510.

As described above, according to yet another embodiment, the wearable device 101 may identify an interaction between the user 1010 and the visual object 1005 within the FoV 510. The wearable device 101 may change information indicating the direction of the eyes of the user 505 obtained using a second camera (e.g., the second camera 420 of FIG. 4) based on identifying the interaction. The wearable device 101 may provide the user 505 with an augmented reality service indicating more realistic coworking by changing the information based on identifying the interaction.

Figure 11:
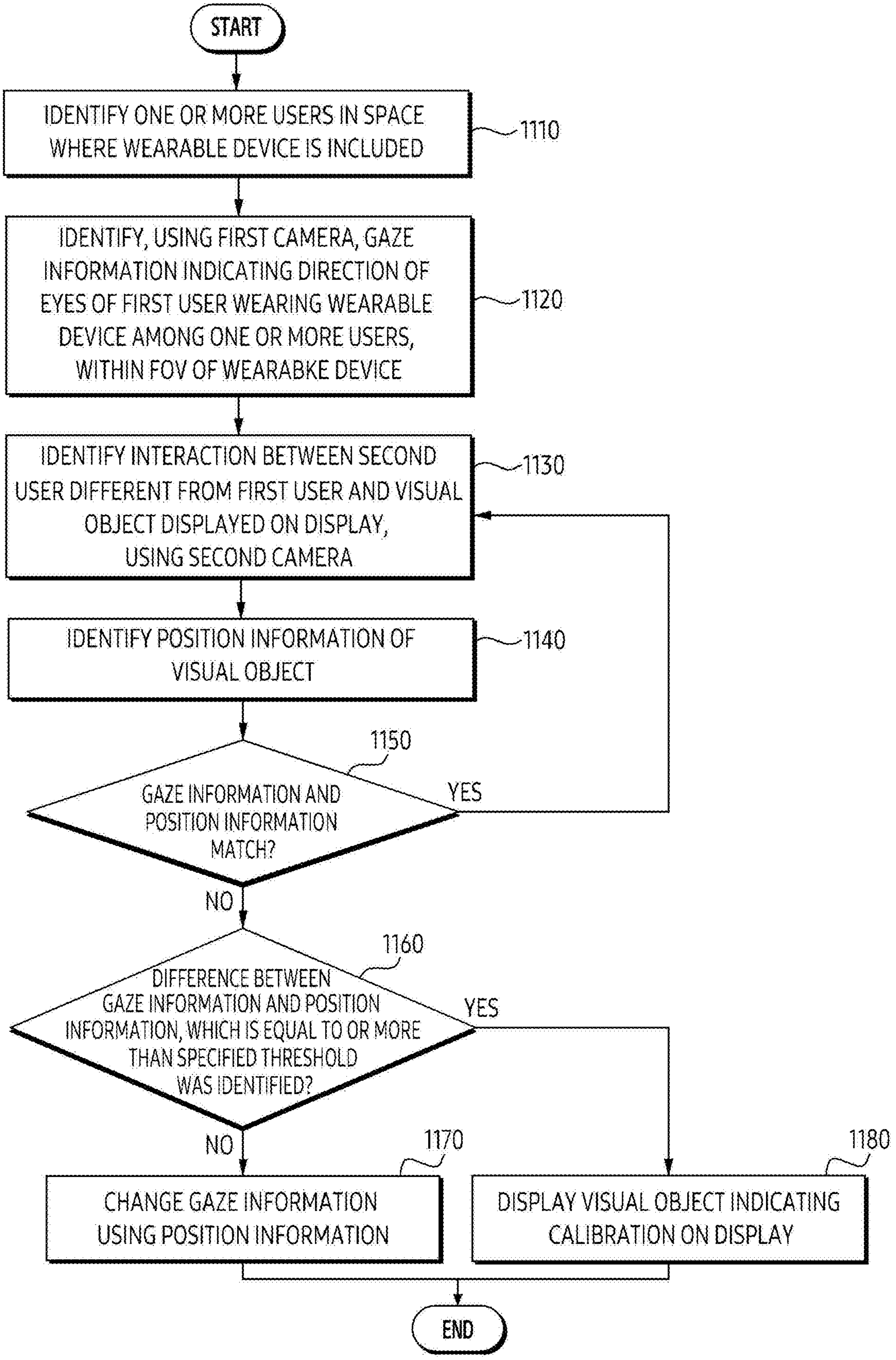
FIG. 11 is a flowchart illustrating an operation of a wearable device according to an embodiment of the disclosure.

FIG. 11 is a flowchart illustrating an operation of a wearable device according to an embodiment of the disclosure. At least one of operations of FIG. 11 may be performed by the electronic device 101 of FIG. 1, the wearable device 101 of FIGS. 2A, 2B, 3A, 3B, 4, 5, 6A to 6C, and 7 to 10, and/or the processor 120 of FIG. 4.

Referring to FIG. 11, according to an embodiment, in an operation 1110, the wearable device may identify one or more users in a space where the wearable device is included. The space where the wearable device is included may be included in the state 1000 of FIG. 10. For example, the one or more users may include the user 1010 of FIG. 10. The wearable device may establish a communication link using communication circuitry with an external electronic device in the space. The wearable device may share position information in the space with the external wearable device of the one or more users, in a state that the communication link is established.

Referring to FIG. 11, according to an embodiment, in an operation 1120, the wearable device may identify gaze information indicating a direction of eyes of a first user wearing the wearable device within a FoV of the wearable device, using a first camera. According to an embodiment, the wearable device may identify, using the first camera (e.g., the second camera 420 of FIG. 4), gaze information (e.g., the position 1025 of FIG. 10) indicating the direction of the eyes of the first user (e.g., the user 505 of FIG. 5) wearing the wearable device among the one or more users, within the FoV (e.g., the FoV of FIG. 5). For example, the gaze information indicating the direction of the eyes may be identified based on an optical axis of the eyes.

Referring to FIG. 11, in an operation 1130, according to an embodiment, the wearable device may identify an interaction between a second user different from the first user and a visual object displayed on a display, using a second camera. According to an embodiment, the wearable device may identify the second user (e.g., the user 1010 of FIG. 10) and/or the visual object (e.g., the visual object 1005 of FIG. 10) using the second camera (e.g., the first camera 410 of FIG. 4). The wearable device may identify the interaction by identifying a contact between at least one hand of the second user and the visual object. For example, the wearable device may identify a point of the visual object matching a direction of a gaze of the second user. The wearable device may identify the interaction, based on identifying the point.

Referring to FIG. 11, in an operation 1140, according to an embodiment, the wearable device may identify position information of the visual object. For example, the position information of the visual object may include the point where the interaction occurred, a center point of the visual object, and/or an area in which the visual object is displayed within the FoV.

Referring to FIG. 11, according to an embodiment, in an operation 1150, the wearable device may identify whether the gaze information and the position information match. For example, in case that the gaze information and the position information match, the wearable device may perform the operation 1130. For example, the wearable device may obtain gaze information including first data indicating a position (e.g., the first position 513 of FIG. 5), based on first frames obtained by using the first camera (e.g., the second camera 420 of FIG. 4). The wearable device may obtain position information including second data indicating a position (e.g., the second position 517 of FIG. 5) based on second frames obtained by using the second camera (e.g., the first camera 410 of FIG. 4). The wearable device may identify positions included in each of the first data and the second data during a specified time. For example, the wearable device may accumulate a parameter indicating whether the gaze information and the position information match by identifying each of the positions during the specified time. The wearable device may identify whether the gaze information and the position information match based on the accumulated parameter after the specified time.

Referring to FIG. 11, in case that the gaze information and the position information do not match (the operation 1150—NO), in an operation 1160, the wearable device according to an embodiment may check whether a difference between gaze information and position information, which is equal to or more than a specified threshold, has been identified. The specified threshold may mean a distance between the gaze information and the position information.

For example, in case that a difference between the gaze information and the position information, which is less than the specified threshold, is identified (the operation 1160—NO), the wearable device according to an embodiment may change the gaze information using the position information in an operation 1170. The wearable device may map the gaze information to the position information. For example, the wearable device may change the gaze information using mapping data based on three dimensions. The wearable device may display a visual object 520 within the FoV (e.g., the FoV 510 of FIG. 5), while changing the gaze information. The wearable device may notify the user of a change in the gaze information by displaying the visual object.

For example, in case that the difference between the gaze information and the position information, which is equal to or more than the specified threshold, is identified (the operation 1160—YES), the wearable device according to an embodiment may display a visual object indicating calibration on the display, in an operation 1180. The visual object indicating the calibration may be referred to the visual object 805 of FIG. 8. The wearable device may guide the calibration of the user using the visual object. According to yet another embodiment, the wearable device may change information indicating the direction of the eyes of the user based on the interaction by displaying the visual object for interacting with a hand of the user wearing the wearable device on the display.

According to yet another embodiment, the wearable device may identify information indicating an eye direction of the user, using at least one camera to obtain information corresponding to the gaze of the user. The wearable device may change the information indicating the identified the direction of the eyes by displaying the visual object within the FoV of the user.

According to yet another embodiment, in the wearable device, a method for compensating for the direction of the eyes of the user wearing the wearable device, corresponding to a point in an image displayed within the FoV of the wearable device is required.

As described above, according to an embodiment, a wearable device 101 may comprise a first camera 410, a second camera 420, a display 450 and a processor 120. The processor may display, using the display, a visual object 515, 620, and 635 within a field of view (FoV) of a user 505, in a state 500, 600, 603, 605, and 800 where the wearable device is worn by the user 505. The processor may, while displaying the visual object, based on the first camera disposed toward the FoV, identify an external object, interacting with the visual object, seen through the FoV. The processor may obtain a position of the external object, based on identifying an interaction between the external object and the visual object using the first camera. The processor may be configured to change information indicating a direction of eyes identified by frames outputted from the second camera disposed toward the eyes of the user, using at least one of a position of the visual object 515 or the position of the external object, based on obtaining the position of the external object.

For example, the processor may change, within the FoV, a position 513, 615-1, 615-2, 615-3, and 1025 matching the direction of the eyes obtained using the information.

For example, the external object may include at least one hand 630 of the user. The processor may track the at least one hand, using the first camera. The processor may be configured to change the information based identifying the interaction between the visual object and the at least one hand.

For example, the processor may be configured to identify the interaction based on identifying at least one of a first gesture indicating the at least one hand pointing the visual object or a second gesture indicating the at least one hand gripping the visual object.

For example, the processor may be configured to, while changing the information, display, within the FoV, a second visual object 520, indicating changing the information, different form a first visual object that is the visual object.

For example, the processor may be configured to, based on identifying a difference of the position of the external object and the direction of the eyes equal to or more than a specified threshold 519, display a third visual object 805, to guide to changing positional relations between the wearable device and the eyes.

For example, the processor may be configured to, based on identifying the difference of the position of the external object and the direction of the eyes less than the specified threshold 519, change the information.

For example, the processor may identify a second user 1010 different from a first user who is the user, in a space where the wearable device is included. The processor may be configured to change the information, based on identifying a second interaction of the visual object and the second user different from a first interaction that is the interaction.

For example, the processor may be configured to identify the second interaction based on identifying the visual object matching a direction of eyes of the second user.

For example, the external object may include at least one hand 1013 of the second user. The processor may be configured to identify the second interaction based on identifying at least one of a third gesture indicating the at least one hand of the second user pointing the visual object or a fourth gesture indicating the at least one hand of the second user gripping the visual object.

As described above, according to an embodiment, in a method of a wearable device 101, the method may comprise displaying, using a display, a visual object 515, 620, and 635 within a field of view (FoV) of a user, in a state 500, 600, 603, 605, and 800 where the wearable device is worn by the user 505. The method may comprise, while displaying the visual object, based on a first camera 410 disposed toward the FoV, identifying an external object, interacting with the visual object, seen through the FoV. The method may comprise obtaining a position of the external object, based on identifying an interaction between the external object and the visual object using the first camera. The method may comprise changing information indicating a direction of eyes identified by frames outputted from a second camera 420 disposed toward the eyes of the user, using at least one of a position (i.e., area 511) of the visual object or the position of the external object, based on obtaining the position of the external object.

For example, the method may comprise changing, within the FoV, a position 513, 615-1, 615-2, 615-3, and 1025 matching the direction of the eyes obtained using the information.

For example, the method may comprise tracking at least one hand 630 included in the external object, using the first camera. The method may comprise changing the information based identifying the interaction of the visual object and the at least one hand.

For example, the method may comprise identifying the interaction based on identifying at least one of a first gesture indicating the at least one hand pointing the visual object or a second gesture indicating the at least one hand gripping the visual object.

For example, the method may comprise, while changing the information, displaying, within the FoV, a second visual object 520 indicating changing the information different form a first visual object that is the visual object.

For example, the method may comprise, based on identifying a difference of the position of the external object and the direction of the eyes equal to or more than a specified threshold 519, displaying a third visual object, to guide to changing positional relations between the wearable device and the eyes.

For example, the method may comprise, based on identifying the difference of the position of the external object and the direction of the eyes less than the specified threshold 519, changing the information.

For example, the method may comprise identifying a second user 1010 different from a first user who is the user, in a space where the wearable device is included. The method may comprise changing the information, based on identifying a second interaction of the visual object and the second user different from a first interaction which is the interaction.

For example, the method may comprise identifying the second interaction based on identifying the visual object matching a direction of eyes of the second user.

As described above, according to an embodiment, in a computer-readable storage medium storing one or more programs, the one or more programs may, when executed by a processor 120 of a wearable device 101, display, using the display, a visual object 515, 620, and 635 within a FoV 510 of a user, in a state 500, 600, 603, 605, and 800 where the wearable device is worn by the user 505. The one or more programs may, when executed by the processor, while displaying the visual object, based on a first camera 410 disposed toward the FoV, identify an external object, interacting with the visual object, seen through the FoV. The one or more programs, when executed by the processor, may obtain a position of the external object, based on identifying an interaction between the external object and the visual object using the first camera. The one or more programs, when executed by the processor, may change information indicating a direction of eyes identified by frames outputted from the second camera 420 disposed toward the eyes of the user, using at least one of a position (i.e., area 511) of the visual object or the position of the external object, based on obtaining the position of the external object.

For example, the one or more programs, when executed by the processor of the wearable device, may change, within the FoV, a position 513, 615-1, 615-2, 615-3, and 1025 matching the direction of the eyes obtained using the information.

For example, the external object may include at least one hand of the user. The one or more programs, when executed by the processor of the wearable device, may track at least one hand 630, using the first camera. The one or more programs may be configured to change the information based identifying the interaction between the visual object and the at least one hand.

For example, the one or more programs, when executed by the processor of the wearable device, may identify a second user 1010 different from a first user who is the user, in a space where the wearable device is included. The one or more programs may be configured to change the information, based on identifying a second interaction of the visual object and the second user, different from a first interaction which is the interaction.

For example, the one or more programs, when executed by the processor of the wearable device, may be configured to identify the second interaction based on identifying the visual object matching a direction of eyes of the second user.

For example, the external object may include at least one hand 1013 of the second user. The one or more programs, when executed by the processor of the wearable device, may be configured to identify the second interaction based on identifying at least one of a third gesture indicating the at least one hand of the second user pointing the visual object or a fourth gesture indicating the at least one hand of the second user gripping the visual object.

As described above, according to an embodiment, in one or more non-transitory computer-readable storage media storing one or more computer programs including computer-executable instructions that, when executed by one or more processors of a wearable device individually or collectively, cause the wearable device to perform operations, the operations comprise displaying, by the wearable device using a display, a visual object within a field of view (FoV) of a user, in a state where the wearable device is worn by the user; while displaying the visual object, based on a first camera disposed toward the FoV, identifying, by the wearable device, an external object, interacting with the visual object, seen through the FoV; obtaining, by the wearable device, a position of the external object, based on identifying an interaction between the external object and the visual object using the first camera; and changing, by the wearable device, information indicating a direction of eyes identified by frames outputted from a second camera disposed toward the eyes of the user, using at least one of a position of the visual object or the position of the external object, based on obtaining the position of the external object.

For example, the operations further comprise changing, within the FoV, a position matching the direction of the eyes obtained using the information.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and digital versatile disc (DVD), magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
- a first camera disposed toward a field of view (FoV) of a user;
- a second camera configured to obtain an image of eyes of the user for identifying a gaze of the user;
- a display;
- at least one processor comprising processing circuitry; and
- memory comprising one or more storage mediums storing instructions,
- wherein the instructions, when executed by the at least one processor individually or collectively, cause the wearable device to:
  - display, using the display, a visual object within a FoV of the first camera, in a state where the wearable device is worn by the user,
  - while displaying the visual object, identify, using the first camera, a point in the visual object indicated by a hand of the user in the FoV, and
  - based on the gaze of the user being identified as positioned within a designated distance from the point using the second camera, calibrate a position of the gaze of the user in accordance with the point.

2. The wearable device of claim 1, wherein the instructions, when executed by the at least one processor individually or collectively, cause the wearable device to: identify a probability that the gaze of the user corresponds to the point in accordance with a distance between the position of the gaze of the user and the point,
- based on the distance being identified shorter than the designated distance, identify that the probability is higher than a threshold, and
- based on identifying that the probability is higher than the threshold, calibrate the position of the gaze of the user in accordance with the point.

3. The wearable device of claim 1, wherein the instructions, when executed by the at least one processor individually or collectively, cause the wearable device to:
- based on the gaze of the user being identified as positioned outside of the designated distance from the point using the second camera, display, using the display, another visual object for guiding to calibrate a wearing state of the wearable device.

4. The wearable device of claim 3, wherein the instructions, when executed by the at least one processor individually or collectively, cause the wearable device to:
- identify a probability that the gaze of the user corresponds to the point in accordance with a distance between the position of the gaze of the user and the point,
- based on the distance being identified as longer than the designated distance, identify that the probability is lower than a threshold, and
- based on identifying that the probability is lower than the threshold, display, using the display, the another visual object.

5. The wearable device of claim 1, wherein the point corresponds to an ending point of a designated gesture of the hand.

6. The wearable device of claim 1, further comprising communication circuitry,
- wherein the instructions, when executed by the at least one processor individually or collectively, cause the wearable device to:
  - receive, using the communication circuitry, from an external object, position information indicating a position of the external object, and
  - calibrate the position of the gaze of the user further based on the position of the external object indicated by the position information.

7. The wearable device of claim 1, wherein the instructions, when executed by the at least one processor individually or collectively, cause the wearable device to:
- calibrate the position of the gaze of the user by changing the position of the gaze of the user to the point.

8. The wearable device of claim 1, wherein the instructions, when executed by the at least one processor individually or collectively, cause the wearable device to:
- identify another user using the first camera in the FoV,
- while displaying the visual object, using the first camera, identify another point in the visual object indicated by a hand of the another user in the FoV, and
- calibrate the position of the gaze of the user further based on the another point.

9. The wearable device of claim 1, further comprising communication circuitry,
- wherein the instructions, when executed by the at least one processor individually or collectively, cause the wearable device to:
  - while another user is in the FoV, receive, via the communication circuitry, from an external electronic device of the another user, information indicating a position of a gaze of the another user, and
  - calibrate the position of the gaze of the user further based on the position of the gaze of the another user indicated by the position information.

10. The wearable device of claim 1, wherein the hand of the user indicates the point by pointing the point in the visual object or grabbing the point in the visual object.

11. A method performed by a wearable device, the method comprising:
- displaying, using a display, a visual object within a field of view (FoV) of a first camera of the wearable device disposed toward a FoV of a user, in a state where the wearable device is worn by the user;
- while displaying the visual object, identifying, using the first camera, a point in an external object indicated by a hand of the user; and
- based on a gaze of the user being identified as positioned within a designated distance from the point using a second camera of the wearable device configured to obtain an image of eyes of the user for identifying the gaze of the user, calibrating a position of the gaze of the user in accordance with the point.

12. The method of claim 11, further comprising:

identifying a probability that the gaze of the user corresponds to the point in accordance with a distance between the position of the gaze of the user and the point, based on the distance being identified shorter than the designated distance, identifying that the probability is higher than a threshold, and based on identifying that the probability is higher than the threshold, calibrating the position of the gaze of the user in accordance with the point.

13. The method of claim 11, further comprising:

based on the gaze of the user being identified as positioned outside of the designated distance from the point using the second camera, displaying, using the display, another visual object for guiding to calibrate a wearing state of the wearable device.

14. The method of claim 13, further comprising:

identifying a probability that the gaze of the user corresponds to the point in accordance with a distance between the position of the gaze of the user and the point, based on the distance being identified as longer than the designated distance, identifying that the probability is higher than a threshold, and based on identifying that the probability is higher than the threshold, calibrating the position of the gaze of the user in accordance with the point.

15. The method of claim 11, wherein the point corresponds to an ending point of a designated gesture of the hand.

16. The method of claim 11, further comprising:

receiving, using communication circuitry, from the external object, position information indicating a position of the external object, and calibrating the position of the gaze of the user further based on the position of the external object indicated by the position information.

17. The method of claim 11, further comprising:

calibrating the position of the gaze of the user by changing the position of the gaze of the user to the point.

18. The method of claim 11, further comprising:

identifying another user using the first camera in the FoV, while displaying the visual object, using the first camera, identifying another point in the visual object indicated by a hand of the another user in the FoV, and calibrating the position of the gaze of the user further based on the another point.

19. The method of claim 11, further comprising:

while another user is in the FoV, receiving, via communication circuitry, from an external electronic device of the another user, information indicating a position of a gaze of the another user, and calibrating the position of the gaze of the user further based on the position of the gaze of the another user indicated by the position information.

20. The method of claim 11, wherein the hand of the user indicates the point by pointing the point in the visual object or grabbing the point in the visual object.

* * * * *